US011321407B2

(12) United States Patent
Huang et al.

(10) Patent No.: US 11,321,407 B2
(45) Date of Patent: May 3, 2022

(54) SEARCH METHOD, AND APPARATUS

(71) Applicant: Honor Device Co., Ltd., Shenzhen (CN)

(72) Inventors: Qing Huang, Beijing (CN); Jie Yang, Beijing (CN)

(73) Assignee: HONOR DEVICE CO., LTD., Shenzhen (CN)

(*) Notice: Subject to any disclaimer, the term of this patent is extended or adjusted under 35 U.S.C. 154(b) by 87 days.

(21) Appl. No.: 16/613,974

(22) PCT Filed: May 18, 2017

(86) PCT No.: PCT/CN2017/084868
§ 371 (c)(1),
(2) Date: Nov. 15, 2019

(87) PCT Pub. No.: WO2018/209635
PCT Pub. Date: Nov. 22, 2018

(65) Prior Publication Data
US 2021/0026905 A1  Jan. 28, 2021

(51) Int. Cl.
*G06F 7/02* (2006.01)
*G06F 16/00* (2019.01)
(Continued)

(52) U.S. Cl.
CPC .......... *G06F 16/9535* (2019.01); *G06F 16/27* (2019.01); *G06F 16/9538* (2019.01)

(58) Field of Classification Search
CPC ... G06F 16/9535; G06F 16/27; G06F 16/9538
See application file for complete search history.

(56) References Cited

U.S. PATENT DOCUMENTS 8,751,516 B1* 6/2014 Wong .................... G06F 16/248
707/758
2008/0034020 A1* 2/2008 Hayakawa .......... G06F 16/3326
(Continued)

FOREIGN PATENT DOCUMENTS

CN  103136356 A  6/2013
CN  103246708 A  8/2013
(Continued)

OTHER PUBLICATIONS

Machine Translation and Abstract of Chinese Publication No. CN103246708, Aug. 14, 2013, 15 pages.
(Continued)

*Primary Examiner* — Bruce M Moser
(74) *Attorney, Agent, or Firm* — Conley Rose, P.C.

(57) ABSTRACT

A search method includes obtaining, by a first terminal, a first key word from a user; searching, by the first terminal based on the first key word, the first terminal for a first search result associated with the first key word; sending, by the first terminal, a first search instruction to a second terminal (the second terminal is a terminal in a device group to which the first terminal belongs), where the first search instruction carries the first key word, to trigger the second terminal to search the second terminal for a second search result associated with the first key word; obtaining, by the first terminal, the second search result from the second terminal.

20 Claims, 18 Drawing Sheets

(51) Int. Cl.
*G06F 16/9535* (2019.01)
*G06F 16/27* (2019.01)
*G06F 16/9538* (2019.01)

(56) References Cited

U.S. PATENT DOCUMENTS

| | | |
|---|---|---|
| 2013/0191414 A1 | 7/2013 | Srivastava et al. |
| 2014/0244609 A1 | 8/2014 | Dong |
| 2015/0067524 A1 | 3/2015 | Park et al. |
| 2015/0112996 A1 | 4/2015 | Mishra et al. |
| 2015/0213127 A1* | 7/2015 | Chang ............... G06F 16/9038 707/722 |
| 2017/0063525 A1 | 3/2017 | Bacon et al. |
| 2018/0176748 A1* | 6/2018 | Kim .................... G06F 8/60 |

FOREIGN PATENT DOCUMENTS

| | | |
|---|---|---|
| CN | 103685411 A | 3/2014 |
| CN | 104123299 A | 10/2014 |
| CN | 104156486 A | 11/2014 |
| CN | 104239341 A | 12/2014 |
| CN | 104965637 A | 10/2015 |
| CN | 105659234 A | 6/2016 |
| WO | 2008157730 A1 | 12/2008 |

OTHER PUBLICATIONS

Machine Translation and Absliact of Chinese Publication No. CN104123299, Oct. 29, 2014, 15 pages.
Machine Translation and Absliact of Chinese Publication No. CN104156486, Nov. 19, 2014, 29 pages.
Machine Translation and Absliact of Chinese Publication No. CN104965637, Oct. 7, 2015, 14 pages.
Foreign Communication From A Counterpart Application, PCT Application No. PCT/CN2017/084868, English Translation of International Search Report dated Feb. 14, 2018, 2 pages.
Foreign Communication From A Counterpart Application, PCT Application No. PCT/CN2017/084868, English Translation of Written Opinion dated Feb. 14, 2018, 4 pages.
"Multicast—Wikipedia," Dec. 14, 2015, 4 pages.

* cited by examiner

SEARCH METHOD, AND APPARATUS

CROSS-REFERENCE TO RELATED APPLICATIONS

This application is a U.S. National Stage of International Patent Application No. PCT/CN2017/084868 filed on May 18, 2017, which is hereby incorporated by reference in its entirety.

TECHNICAL FIELD

Embodiments of the present invention relate to the field of communications technologies, and in particular, to a search method and an apparatus.

BACKGROUND

Wide application of a terminal such as a smartphone is accompanied with an increase in an amount of data stored in the terminal. Therefore, a native search function specified in the terminal becomes one of important functions commonly used by a user.

As shown in FIG. 1, a user may enter a key word into a search box after entering a native search interface. Then, a terminal compares the key word with indexes of all locally-stored files, and then presents a search result that matches the key word to the user. Certainly, if the user is dissatisfied with the current search result, the user may further trigger the terminal to search the Internet or an application store for the key word.

However, the native search function can be used to display, to a user, only a search result that matches a key word in a currently-operated terminal. When the user has a plurality of terminals, for example, the user may have a plurality of terminals such as a mobile phone, a wearable device, and a tablet computer, if the user enables the native search function in the mobile phone to search for a song, the mobile phone cannot provide a corresponding search result for the user when the mobile phone does not store the song or related information of the song. However, the tablet computer of the user may have stored the song or the related information of the song, but the user does not know. Consequently, search efficiency of the native search function is reduced.

SUMMARY

Embodiments of the present invention provide a search method and an apparatus, to implement a shared data search among a plurality of terminals in a scenario in which a plurality of terminals are interconnected, thereby improving search efficiency.

The following technical solutions are used in the embodiments of the present invention to achieve the foregoing objective.

According to a first aspect, an embodiment of the present invention provides a search method, including: obtaining, by a first terminal, a first key word entered by a user; searching, based on the first key word, the first terminal for a first search result associated with the first key word; sending, by the first terminal, a first search instruction to a second terminal (the second terminal is a terminal in a device group to which the first terminal belongs), where the first search instruction carries the first key word, to trigger the second terminal to search the second terminal for a second search result associated with the first key word; obtaining, by the first terminal, the second search result from the second terminal; and displaying search results of all terminals in the device group for the first key word, namely, the first search result and the second search result, so that the user can find all the search results associated with the first key word in the device group, in other words, the user can implement a shared data search among a plurality of terminals, thereby improving search efficiency.

In a possible design method, after the searching the first terminal for a first search result associated with the first key word, the method further includes: sending, by the first terminal, the first search result to the second terminal. To be specific, each terminal in the device group may send a search result found from the terminal to another terminal in the device group. In this way, each terminal in the device group can obtain all the search results associated with the first key word. Therefore, the user can view the search results on any terminal in the device group, to avoid a limitation that the user views a search result only on a terminal that initiates a search operation.

In a possible design method, after the displaying, by the first terminal, the first search result and the second search result, the method further includes: obtaining, by the first terminal, an operation instruction that is triggered by the user for target content in the second search result; synchronizing, by the first terminal, the target content from the second terminal to the first terminal because the target content in the second search result is stored in the second terminal; and executing the operation instruction on the first terminal without a terminal change performed by the user.

In a possible design method, after the displaying, by the first terminal, the first search result and the second search result, the method further includes: obtaining, by the first terminal, an operation instruction that is triggered by the user for target content in the second search result; and prompting the user to execute the operation instruction on the second terminal when the first terminal is incapable of supporting execution of the operation instruction at the moment.

In a possible design method, after the obtaining, by the first terminal, the second search result sent by the second terminal, the method further includes: obtaining, by the first terminal, a third search result sent by the second terminal, where the third search result is a search result associated with the first key word in the second terminal, and there is no intersection set between the third search result and the second search result. To be specific, when the second terminal reports a search result in the terminal to the first terminal, the second terminal may simultaneously trigger a search result report process in a search process. This can reduce a search result transmission delay, reduce search result wait time of the user, and reduce loading pressure of a terminal in the device group during search result transmission.

In a possible design method, after the displaying, by the first terminal, the first search result and the second search result, the method further includes: obtaining, by the first terminal, a second key word entered by the user, where the second key word is a subset of the first key word; and when the terminals in the device group do not change, searching, by the first terminal, the first search result and the second search result for a fourth search result associated with the second key word.

In a possible design method, after the obtaining, by the first terminal, a second key word entered by the user, the method further includes: when the second terminal exits from the device group, searching, by the first terminal, the first search result for a fifth search result associated with the second key word.

In a possible design method, after the obtaining, by the first terminal, a second key word entered by the user, the method further includes: when a third terminal joins the device group, sending, by the first terminal, a second search instruction to the third terminal, where the second search instruction carries the second key word; and obtaining, by the first terminal, a sixth search result sent by the third terminal, where the sixth search result is a search result associated with the second key word in the third terminal.

It can be learned that, for continuous search behavior of the user, when the second key word that is later searched for is a subset of the first key word that is earlier searched for, the user does not need to initiate a new search process on each terminal in the device group, but determines a search result of the second key word based on a changing status of the terminals in the device group and based on the search results of the first key word, thereby improving continuous search efficiency.

In a possible design method, the displaying, by the first terminal, the first search result and the second search result includes: displaying, by the first terminal, the first search result and an identifier of the first terminal in a first display area, and displaying the second search result and an identifier of the second terminal in a second display area, where the first display area and the second display area are two areas that do not overlap within a display interface.

In a possible design method, the device group includes N terminals logged in to by using a same account, and/or N terminals that have established connections to the first terminal, and N is an integer greater than 1.

According to a second aspect, an embodiment of the present invention provides a search method, including: obtaining, by a second terminal, a first search instruction sent by a first terminal, where the first search instruction carries a first key word entered by a user into the first terminal, and the second terminal is a terminal in a device group to which the first terminal belongs searching, by the second terminal, the second terminal for a second search result associated with the first key word; and sending, by the second terminal, the second search result to the first terminal.

In a possible design method, after the obtaining, by a second terminal, a first search instruction sent by a first terminal, the method further includes: receiving, by the second terminal, a first search result sent by the first terminal, where the first search result is a search result associated with the first key word in the first terminal.

In a possible design method, after the receiving, by the second terminal, a first search result sent by the first terminal, the method further includes: displaying, by the second terminal, the first search result and the second search result.

In a possible design method, after the searching, by the second terminal, the second terminal for a second search result associated with the first key word, the method further includes: searching, by the second terminal, the second terminal for a third search result associated with the first key word, where there is no intersection set between the third search result and the second search result; and sending, by the second terminal, the third search result to the first terminal.

According to a third aspect, an embodiment of the present invention provides a terminal, including: an obtaining unit, configured to obtain a first key word entered by a user; a search unit, configured to search, based on the first key word, the first terminal for a first search result associated with the first key word; a sending unit, configured to send a first search instruction to a second terminal, where the first search instruction carries the first key word, and the second terminal is a terminal in a device group to which the first terminal belongs; and a display unit, configured to display the first search result and the second search result.

In a possible design method, the sending unit is further configured to send the first search result to the second terminal.

In a possible design method, the obtaining unit is further configured to: obtain an operation instruction that is triggered by the user for target content in the second search result, and synchronize the target content from the second terminal to the first terminal; and an execution unit is configured to execute the operation instruction.

In a possible design method, the obtaining unit is further configured to obtain an operation instruction that is triggered by the user for target content in the second search result; and the display unit is further configured to prompt the user to execute the operation instruction on the second terminal.

In a possible design method, the obtaining unit is further configured to obtain a third search result sent by the second terminal, where the third search result is a search result associated with the first key word in the second terminal, and there is no intersection set between the third search result and the second search result.

In a possible design method, the obtaining unit is further configured to obtain a second key word entered by the user, where the second key word is a subset of the first key word; and the search unit is further configured to: when terminals in the device group do not change, search the first search result and the second search result for a fourth search result associated with the second key word.

In a possible design method, the search unit is further configured to: when the second terminal exits from the device group, search the first search result for a fifth search result associated with the second key word.

In a possible design method, the sending unit is further configured to: when a third terminal joins the device group, send a second search instruction to the third terminal, where the second search instruction carries the second key word; and the obtaining unit is further configured to obtain a sixth search result sent by the third terminal, where the sixth search result is a search result associated with the second key word in the third terminal.

According to a fourth aspect, an embodiment of the present invention provides a terminal, including: an obtaining unit, configured to obtain a first search instruction sent by a first terminal, where the first search instruction carries a first key word entered by a user into the first terminal, and the second terminal is a terminal in a device group to which the first terminal belongs; a search unit, configured to search the second terminal for a second search result associated with the first key word; and a sending unit, configured to send the second search result to the first terminal.

In a possible design method, the obtaining unit is further configured to receive a first search result sent by the first terminal, where the first search result is a search result associated with the first key word in the first terminal.

In a possible design method, the terminal further includes: a display unit, configured to display the first search result and the second search result.

In a possible design method, the search unit is further configured to search the second terminal for a third search result associated with the first key word, where there is no intersection set between the third search result and the second search result; and the sending unit is further configured to send the third search result to the first terminal.

According to a fifth aspect, an embodiment of the present invention provides a terminal, including a processor, a memory, a bus, and a communications interface, where the memory is configured to store a computer execution instruction; the processor and the memory are connected by using the bus; and when the terminal runs, the processor executes the computer execution instruction stored in the memory, so that the terminal performs any one of the foregoing search methods.

According to a sixth aspect, an embodiment of the present invention provides a computer readable storage medium. The computer readable storage medium stores an instruction, and when the instruction is executed on any one of the foregoing terminals, the terminal performs any one of the foregoing search methods.

According to a seventh aspect, an embodiment of the present invention provides a computer program product including an instruction. When the computer program product runs on any one of the foregoing terminals, the terminal performs any one of the foregoing search methods.

In the embodiments of the present invention, names of the foregoing terminals constitute no limitation on the devices. In actual implementation, these devices may appear with other names. These devices with other names fall within the scope of the claims of the present invention and equivalent technologies thereof provided that functions of the devices are similar to those described in the embodiments of the present invention.

In addition, for technical effects brought by any design manner in the second to the seventh aspects, refer to technical effects brought by different design methods in the first aspect. Details are not described herein again.

DESCRIPTION OF EMBODIMENTS

The terms "first" and "second" in the following are merely intended for a purpose of description, and shall not be understood as an indication or implication of relative importance or an implicit indication of a quantity of indicated technical features. Therefore, a feature restricted by "first" or "second" may explicitly indicate or implicitly include one or more such features. In the descriptions in the embodiments of the present invention, unless otherwise provided, "a plurality of" means "two or more".

The embodiments of the present invention provide a search method. The method may be applied to any terminal such as a mobile phone, a wearable device, an AR (augmented reality)/VR (virtual reality) device, a tablet computer, a notebook computer, a UMPC (ultra-mobile personal computer), a netbook, and a PDA (personal digital assistant). This is not limited in the embodiments of the present invention.

Figure 1:
FIG. 1 is a schematic diagram of an application scenario of a native search function in the prior art.
Figure 2:
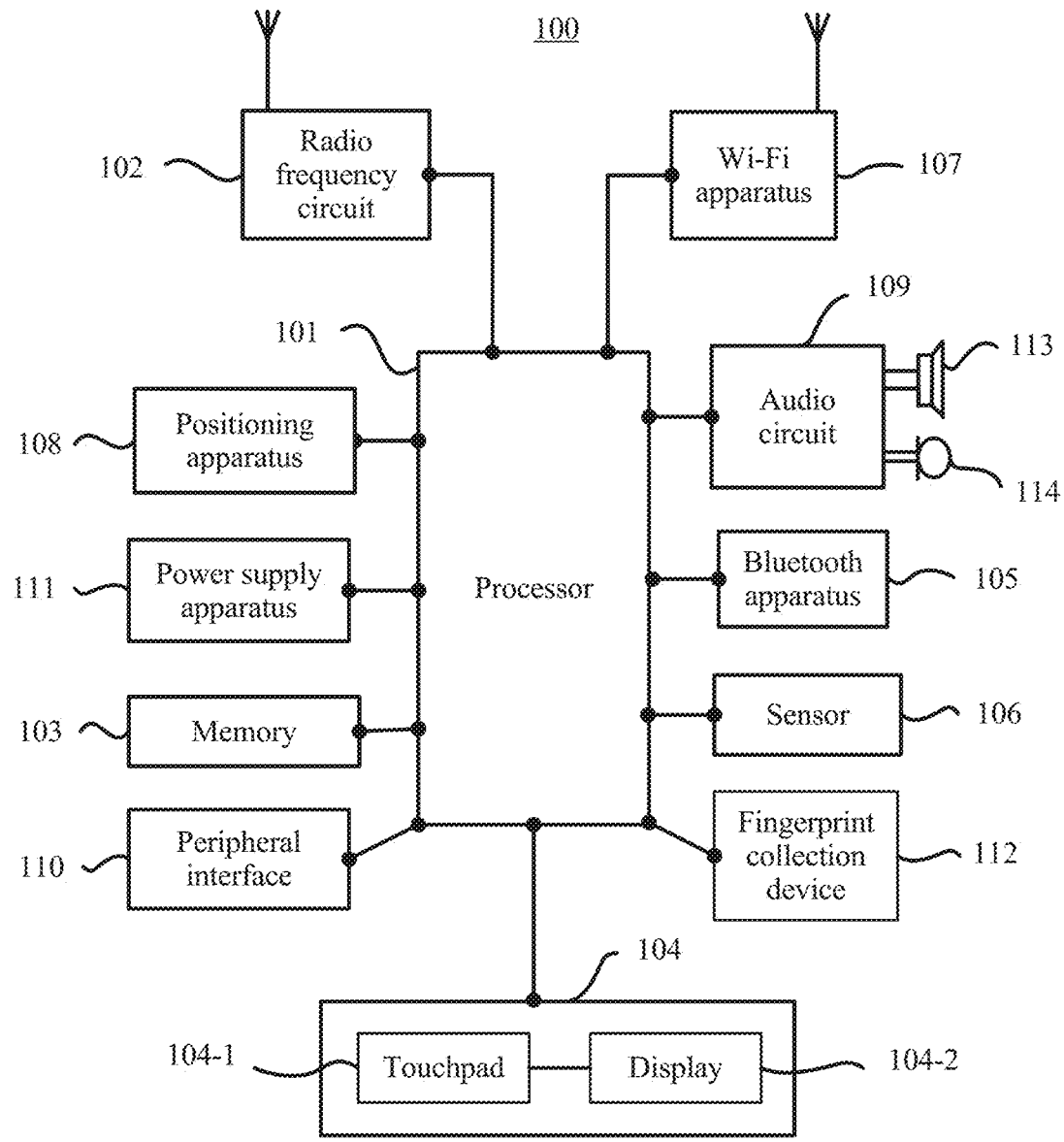
FIG. 2 is a schematic structural diagram 1 of a terminal according to an embodiment of the present invention.

As shown in FIG. 2, a terminal in the embodiments of this application may be a mobile phone 100. The following describes an embodiment in detail by using the mobile phone 100 as an example. It should be understood that the mobile phone 100 shown in the figure is merely an example of the terminal, and the mobile phone 100 may have more or fewer components than those shown in the figure, may combine two or more components, or may have different component configurations.

As shown in FIG. 2, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal cables (not shown in FIG. 2). A person skilled in the art may understand that a hardware structure shown in FIG. 2 constitutes no limitation on the mobile phone, and the mobile phone 100 may include more or fewer components than those shown in the figure, may combine some components, or may have different component arrangements.

The following describes the components of the mobile phone 100 in detail with reference to FIG. 2.

The processor 101 is a control center of the mobile phone 100. The processor 101 is connected to all parts of the mobile phone 100 by using various interfaces and lines, and runs or executes an application program (which may be briefly referred to as App in the following) stored in the memory 103 and invokes data stored in the memory 103, to implement various functions of the mobile phone 100 and process data. In some embodiments, the processor 101 may include one or more processing units. For example, the processor 101 may be a Kirin 960 chip manufactured by Huawei. In this embodiment of the present invention, the processor 101 may perform the search method in the following embodiments of the present invention, for example, a related method shown in FIG. 4, in combination with the other components of the mobile phone 100. It may be understood that the processor invokes the data stored in the memory to implement a display function. For example, the processor displays a search result by controlling a display module/a display screen; and the processor receives or sends a network message by using a communications module. This is not specifically limited in this embodiment of the present invention.

The radio frequency circuit 102 may be configured to receive and send a radio signal in an information receiving and sending process or in a call process. In particular, after receiving downlink data from a base station, the radio frequency circuit 102 may send the downlink data to the processor 101 for processing. In addition, the radio frequency circuit 102 sends uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication, and includes but is not limited to a Global System for Mobile Communications, a general packet radio service, Code Division Multiple Access, Wideband Code Division Multiple Access, Long Term Evolution, email, a short message service, and the like.

The memory 103 is configured to store an application program and data. The processor 101 runs the application program stored in the memory 103 and invokes the data stored in the memory 103, to implement various functions of the mobile phone 100 and process data. The memory 103 mainly includes a program storage area and a data storage area. The program storage area may store an operating system and an application program required by at least one function (for example, a sound play function or an image play function). The data storage area may store data (for example, audio data or a phone book) created based on use of the mobile phone 100. In addition, the memory 103 may include a high-speed random access memory, or may include a nonvolatile memory such as a magnetic disk storage device, a flash storage device, or another volatile solid-state storage device. The memory 103 may store various operating systems such as an iOS operating system developed by Apple and an Android operating system developed by Google.

The touchscreen 104 may include a touchpad 104-1 and a display 104-2. The touchpad 104-1 can collect a touch event performed by a user of the mobile phone 100 on or near the touchpad 104-1 (for example, an operation performed by the user on the touchpad 104-1 or near the touchpad 104-1 by using any proper object such as a finger or a stylus), and send collected touch information to another component such as the processor 101. A touch event performed by the user near the touchpad 104-1 may be referred to as a floating touch. The floating touch may mean that the user does not need to directly touch the touchpad for selecting, moving, or dragging an object (for example, an icon), but the user only needs to be near the terminal to implement a desired function. In an application scenario of the floating touch, terms such as "touch" and "contact" do not imply that the user directly touches the touchscreen, but mean a contact near or close to the touchscreen. The touchpad 104-1 on which the floating touch can be performed may be implemented by using a capacitive type, an infrared photoreceptor, and an ultrasonic wave, or the like. In addition, the touchpad 104-1 may be implemented by using a plurality of types such as a resistive type, a capacitive type, an infrared ray, and a surface acoustic wave. The display (also referred to as a display screen) 104-2 may be configured to display information entered by the user or information provided for the user, and various menus of the mobile phone 100. The display 104-2 can be configured in a form of a liquid crystal display, an organic light emitting diode, or the like. The touchpad 104-1 may cover the display 104-2. When detecting a touch event on or near the touchpad 104-1, the touchpad 104-1 transfers the touch event to the processor 101 to determine a type of the touch event. Then, the processor 101 can provide a corresponding visual output on the display 104-2 based on the type of the touch event. Although in FIG. 2, the touchpad 104-1 and the display screen 104-2 are used as two independent parts to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking a plurality of layers of materials. In this embodiment of this application, only the touchpad (layer) and the display screen (layer) are displayed, and another layer is not recorded in this embodiment of this application. In addition, in some other embodiments of this application, the touchpad 104-1 may cover the display 104-2, and a size of the touchpad 104-1 is greater than a size of the display screen 104-2, so that the display screen 104-2 is entirely covered by the touchpad 104-1. Alternatively, the touchpad 104-1 may be configured on the front of the mobile phone 100 in a full panel form, in other words, any touch performed by the user on the front of the mobile phone 100 can be sensed by the mobile phone. In this way, full touch experience on the front of the mobile phone can be implemented. In some other embodiments, the touchpad 104-1 is configured on the front of the mobile phone 100 in a full panel form, and the display screen 104-2 may also be configured on the front of the mobile phone 100 in the full panel form. In this way, a bezel (Bezel)-less structure can be implemented on the front of the mobile phone.

In this embodiment of this application, the mobile phone 100 may further have a fingerprint recognition function. For example, a fingerprint collection device 112 may be configured in the touchscreen 104 to implement the fingerprint recognition function. In other words, the fingerprint collection device 112 may be integrated with the touchscreen 104 to implement the fingerprint recognition function of the mobile phone 100. A main component of the fingerprint collection device 112 in this embodiment of this application is a fingerprint sensor. The fingerprint sensor can use any type of sensing technology, including but not limited to an optical type of sensing technology, a capacitive type of sensing technology, a piezoelectric type of sensing technology, an ultrasonic sensing technology, and the like.

The mobile phone 100 may further include the Bluetooth apparatus 105, configured to implement data exchange between the mobile phone 100 and another terminal (for example, a mobile phone or a smartwatch) at a short distance from the mobile phone 100. The Bluetooth apparatus in this embodiment of this application may be an integrated circuit, a Bluetooth chip, or the like.

The mobile phone 100 may further include at least one type of sensor 106 such as an optical sensor, a motion sensor, and another sensor. Specifically, the optical sensor may include an ambient optical sensor and a proximity sensor. The ambient optical sensor may adjust luminance of the display of the touchscreen 104 based on brightness of ambient light, and the proximity sensor may power off the display when the mobile phone 100 moves to an ear. As a type of motion sensor, an accelerometer sensor may detect values of accelerations in all directions (usually, three axes), may detect a value and a direction of gravity when the sensor is stationary, and may be used for an application identifying a mobile phone posture (such as screen switching between a landscape mode and a portrait mode, a related game, or magnetometer posture calibration), a vibration identification-related function (such as a pedometer or a stroke), and the like. Other sensors such as a gyroscope, a barometer, a hygrometer, a thermometer, and an infrared sensor that may be alternatively configured on the mobile phone 100 are not described herein.

The Wi-Fi apparatus 107 is configured to provide, for the mobile phone 100, network access that complies with a Wi-Fi-related standard protocol. The mobile phone 100 may access a access point by using the Wi-Fi apparatus 107, and then help the user receive and send an email, browse a web page, access streaming media, and the like. The Wi-Fi apparatus 107 provides wireless broadband Internet access for the user. In some other embodiments, the Wi-Fi apparatus 107 may also be used as a Wi-Fi wireless access point, and may provide Wi-Fi network access for another terminal.

The positioning apparatus 108 is configured to provide a geographic location for the mobile phone 100. It may be understood that the positioning apparatus 108 may be specifically a receiver of a positioning system such as a Global Positioning System (GPS), a BeiDou. Navigation Satellite System, or a Russian GLONASS. After receiving a geographic location sent by the positioning system, the positioning apparatus 108 sends the information to the processor 101 for processing, or sends the information to the memory 103 for storage. In some other embodiments, the positioning apparatus 108 may alternatively be a receiver of an Assisted Global Positioning System (AGPS). The AGPS system is used as an assisted server to assist the positioning apparatus 108 in completing a ranging and positioning service. In this case, the assisted positioning server communicates with a terminal, for example, the positioning apparatus 108 of the mobile phone 100 (namely, a GPS receiver), by using a wireless communications network, to provide positioning assistance. In some other embodiments, the positioning apparatus 108 may alternatively be a positioning technology that is based on a Wi-Fi access point. Each Wi-Fi access point has a globally unique MAC address, and the terminal can scan and collect a broadcast signal of a surrounding Wi-Fi access point when Wi-Fi is enabled. Therefore, the terminal can obtain a MAC address broadcasted by the Wi-Fi access point. The terminal sends such data (for example, the MAC address) that can identify the Wi-Fi access point to a location server by using the wireless communications network. The location server retrieves a geographic location of each Wi-Fi access point, calculates a geographic location of the terminal with reference to strength of the broadcast signal, and sends the geographic location of the terminal to the positioning apparatus 108 of the terminal.

The audio circuit 109, a loudspeaker 113, and a microphone 114 may provide an audio interface between the user and the mobile phone 100. The audio circuit 109 may transmit, to the loudspeaker 113, an electrical signal converted from received audio data, and the loudspeaker 113 converts the electrical signal into a sound signal for outputting. In addition, the microphone 114 converts a collected sound signal into an electrical signal, and the audio circuit 109 converts the electrical signal into audio data after receiving the electrical signal, and then outputs the audio data to the RF circuit 102 to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identity module card). For example, the mobile phone 100 is connected to the mouse by using a universal serial bus (USB) interface, and is connected, by using a metal contact on a card slot of the subscriber identity module card, to the subscriber identity module (SIM) card provided by a telecommunications operator. The peripheral interface 110 may be configured to couple the external input/output peripheral device to the processor 101 and the memory 103.

The mobile phone 100 may further include the power supply apparatus 111 (for example, a battery and a Power Management IC) that supplies power to the components. The battery may be logically connected to the processor 101 by using the Power Management IC, so that functions such as charging, discharging, and power consumption management are implemented by using the power supply apparatus 111.

Although not shown in FIG. 2, the mobile phone 100 may further include a camera (a front-facing camera and/or a rear-facing camera), a camera flash, a micro projection apparatus, a near field communication (NFC) apparatus, and the like. Details are not described herein.

In the search method provided in the embodiments of the present invention, a plurality of terminals may be set as a device group, and communication may be implemented between any terminals in the device group. For example, a mobile phone, a wearable device, and a notebook computer of a user are used as a device group. When the user logs in to the mobile phone, the wearable device, and the notebook computer by using a same account, the mobile phone, the wearable device, and the notebook computer form a local area network (LAN), and mutual communication may be performed between any terminals in the local area network.

For another example, a terminal (for example, a first terminal) that initiates a search may set one or more terminals that have established communication connections (for example, Bluetooth connections and/or Wi-Fi connections) to the terminal as a device group.

Certainly, a user may manually set members in a device group. For example, a user A sets, as a device group, a mobile phone and a wearable watch that are logged in to by the user by using a same account, and a mobile phone that is of a user B and that is currently connected by using Bluetooth, and communication may be implemented between any terminals in the device group. This is not limited in this embodiment of the present invention.

Therefore, when a user enters a key word into a first terminal in a device group to trigger a native search function, in addition to locally searching the first terminal for a first search result associated with the key word, the first terminal may further send, to another terminal in the device group, a search instruction that carries the key word. In this way, the terminal receiving the search instruction may locally search the terminal for a second search result associated with the key word, and send the obtained second search result to the first terminal. In this way, the first terminal can obtain a set of search results (including the first search result and the second search result) associated with the key word in all terminals in the device group, and then present the set of search results to the user, so that the user can find all the search results associated with the key word in the device group, in other words, the user can implement a shared data search among a plurality of terminals, thereby improving search efficiency.

Further, each terminal in the device group may send a search result found from the terminal to another terminal in the device group. In this way, each terminal in the device group can obtain the set of search results. Therefore, the user can view the search results on any terminal in the device group, to avoid a limitation that the user views a search result only on a terminal that initiates a search operation.

For example, the terminals in the device group may form a local area network. Interworking between the terminals in the local area network may be implemented in a star networking manner, a mesh (wireless mesh network) networking manner, or the like. This is not limited in this embodiment of the present invention.

Figure 3:
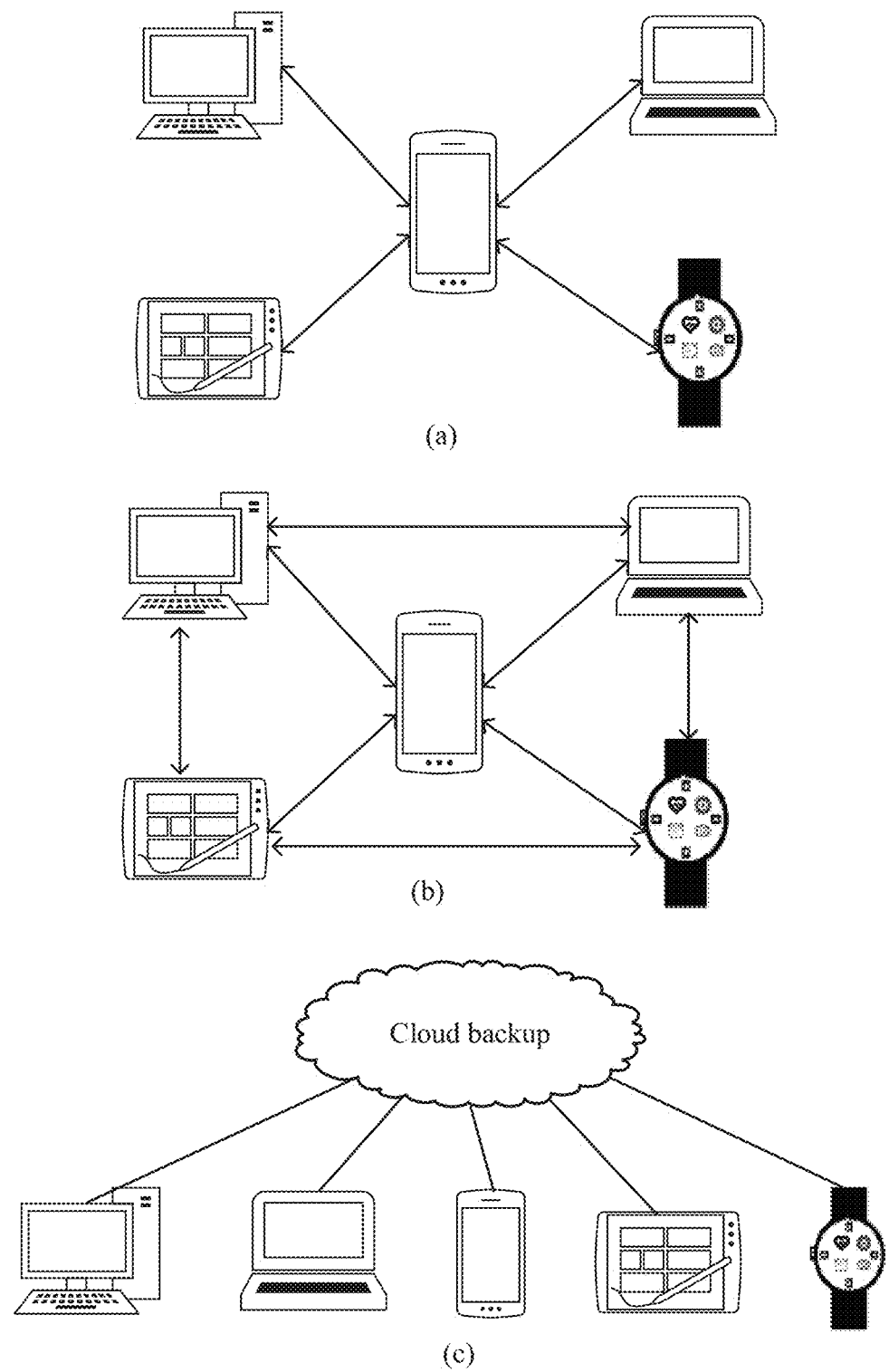
FIG. 3 is a schematic diagram 1 of an application scenario of a search method according to an embodiment of the present invention.

As shown in (a) in FIG. 3, in a star networking manner, all terminals in a network are centered around a central node (a mobile phone in FIG. 3 (a)) and are connected to the central node by using connection lines. In this case, if one terminal needs to transmit data to another terminal, the terminal first transmits the data to the central node, and then the central node sends the data to the another terminal. As shown in (b) in FIG. 3, in a mesh networking manner, each terminal in a network may directly communicate with another terminal in a point-to-point manner.

Alternatively, as shown in (c) in FIG. 3, each terminal in a device group may back locally-stored various pieces of data up onto a server on a network side in a cloud backup manner. Interworking between terminals in the device group may be specifically implemented in a wireless communication manner such as Wi-Fi or Bluetooth, or in a manner such as a cellular mobile network. For example, when communicating with a notebook computer, a mobile phone may first send a related instruction or data to a server or a base station, and then the server or the base station transmits, to the notebook computer, the instruction or the data that is sent by the mobile phone. This is not limited in this embodiment of the present invention.

Figure 4:
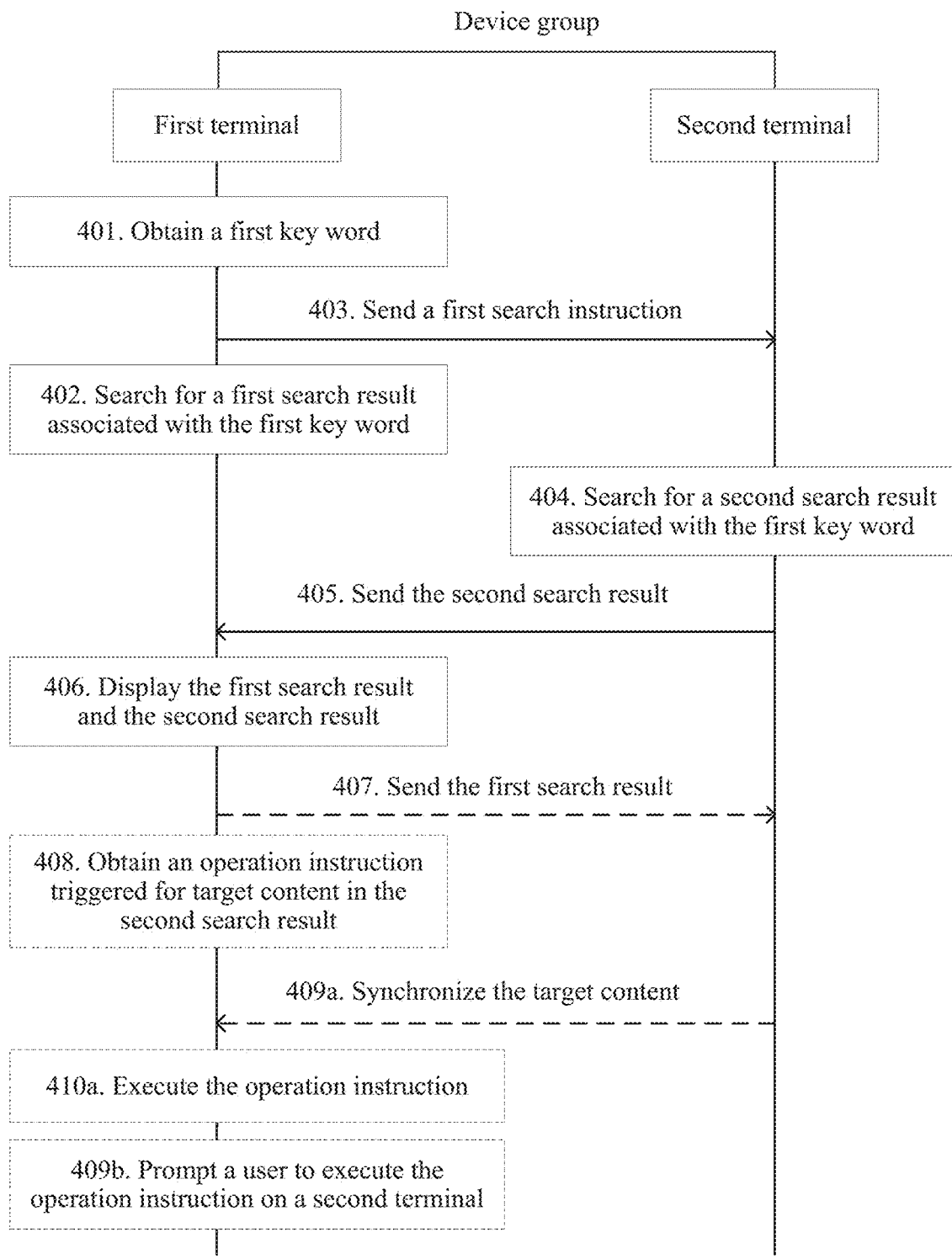
FIG. 4 is a schematic interaction diagram of a search method according to an embodiment of the present invention.

The following describes in detail a search method according to an embodiment of the present invention with reference to a specific embodiment. As shown in FIG. 4, the method includes the following steps.

401. A first terminal obtains a first key word entered h a user.

Specifically, information that is entered by the user into a search box when the user enables a search function may be used as the first key word. Generally, after entering the first key word into the search box, the user taps an "OK" or "Enter" key. In this case, the first terminal may obtain the first key word, for example, "sea", entered by the user into the search box.

It should be noted that the first key word may be at least one of a character, a word, a phrase, a sentence, and a symbol that are entered by the user into the search box. This is not limited in this embodiment of the present invention.

402. The first terminal searches, based on the first key word, the first terminal for a first search result associated with the first key word.

After obtaining the first key word, the first terminal may locally search, in other words, search the first terminal, for the first search result associated with the first key word, for example, an SMS message, a text, a video, audio, an application, or a contact that includes the first key word. This is not limited in this embodiment of the present invention.

In addition, after obtaining the first key word, in other words, after performing step 401, the first terminal may further perform the following step 403. In other words, a time sequence relationship between step 402 and step 403 is not limited in this embodiment of the present invention. The first terminal may perform step 402 before step 403; perform step 403 before step 402; or perform step 402 and step 403 simultaneously. This is not limited in this embodiment of the present invention.

403. The first terminal sends a first search instruction to a second terminal in a device group, where the first search instruction carries the first key word.

Specifically, after obtaining the first key word, the first terminal may send, in a multicast form, the first key word to all terminals in the device group except the first terminal, for example, the second terminal, to trigger another terminal in the device group to locally search for a search result associated with the first key word.

For example, the device group includes the first terminal and the second terminal. A multicast address (Multicast Address) may be assigned to the device group. The first terminal may send, to the second terminal based on the multicast address, the first search instruction that carries the first key word.

When this multicast transmission manner is used, a packet has a group of destination addresses rather than one destination address. All information receivers (namely, all the terminals in the device group) join one group. Once all the information receivers join the group, data flowing to a multicast address immediately starts to be transmitted to the receivers, and all the members in the device group can receive the packet. In addition, in this multicast transmission manner, the members in the device group are dynamic, and a terminal may join or leave the device group at any moment.

It can be learned that when transmission is performed in the multicast form, if one terminal in the device group simultaneously sends same data to a plurality of receivers, the terminal only needs to copy a packet once and sends the packet to the receivers based on a multicast address, so that data transmission efficiency is improved, thereby reducing a possibility of congestion in a data transmission process.

In addition, when the device group further includes a terminal other than the first terminal or the second terminal, the second terminal may further send the first search instruction to the another terminal in the device group.

The first terminal may send the first search instruction to the terminals in the device group in different manners. For example, when the first terminal is connected to the second terminal in the device group by using Bluetooth, the first terminal may send the first search instruction to the second terminal by using a Bluetooth signal; and when the first terminal is connected to a third terminal in the device group by using Wi-Fi, the first terminal may send the first search instruction to the third terminal by using a Wi-Fi signal.

404. In response to the first search instruction, the second terminal searches the second terminal for a second search result associated with the first key word.

After receiving the first search instruction, similar to step 402, the second terminal may locally search the second terminal for the second search result associated with the first key word.

The second search result may be a file, an address book card, an SMS message, an email, description information that includes the first key word, or the like. For example, the second terminal finds an audio file associated with the first key word "sea" in the second terminal. In this case, the second search result may be the audio file, or may be description information such as a name and a singer of the audio file. This is not limited in this embodiment of the present invention.

Further, the second terminal may search, in the background, for the second search result associated with the first key word. In this way, a display interface of an application that is running in the foreground in the second terminal is not affected, to avoid an interruption to an operation that is being performed by the user on the second terminal.

405. The second terminal sends the second search result to the first terminal.

Similarly, the second terminal may send the second search result to the first terminal in the multi cast form.

In addition, when the device group further includes a terminal other than the first terminal or the second terminal, the second terminal may further send the second search result to the another terminal in the device group, so that each terminal in the device group obtains the second search result associated with the first key word in the second terminal. Similar to step 403, the second terminal may also send the second search result to the terminals in the device group in different manners.

In a possible design method, when locally searching for a search result associated with the first key word, the second terminal may perform an incremental search based on a fixed search cycle. For example, after receiving the first search instruction, the second terminal uses 2 seconds as a search cycle, and sends a search result found within 2 seconds to the first terminal as the second search result. Then, the second terminal circularly locally searches, within next 2 seconds, for a search result associated with the first key word, and sends a search result found within the 2 seconds to the first terminal as a third search result (there is no intersection set between content of the third search result and content of the second search result), until the second terminal finds all search results associated with the first key word.

In another possible design method, when locally searching for a search result associated with the first key word, the second terminal may perform an incremental search based on a fixed search entry quantity. For example, after receiving the first search instruction, the second terminal uses five search results as a search entry quantity. After finding five search results associated with the first key word, the second terminal may send the five search results to the first terminal as the second search result. Then, after finding five search results associated with the first key word again, the second terminal sends the five search results to the first terminal as a third search result (there is no intersection set between content of the third search result and content of the second search result), until the second terminal finds all search results associated with the first key word.

To be specific, when any terminal in the device group reports a search result in the terminal to a terminal (for example, the first terminal) that initiates a search function, the terminal may simultaneously trigger a search result report process in a search process. This can reduce a search result transmission delay, reduce search result wait time of the user, and reduce loading pressure of a terminal in the device group during search result transmission.

406. The first terminal displays the first search result and the second search result.

Figure 5:
FIG. 5 is a schematic diagram 2 of an application scenario of a search method according to an embodiment of the present invention.

For example, as shown in FIG. 5, after a user enters a first key word "sea" into a search box, a first search result in a mobile phone 100 (the first terminal) includes content of one SMS message and content of one WeChat message, and a second search result in a notebook computer (the second terminal) includes an audio file. In this case, the mobile phone 100 may separately display, to the user in different areas based on a terminal to which a search result belongs, the first search result that belongs to the mobile phone 100 and the second search result that belongs to the notebook computer, so that the user can clearly learn search results for "sea" in different terminals in a device group.

When a search result is a file such as a media file, a text file, a data file, or an email, because this type of file usually occupies relatively large memory, only description information of the file such as a file name, a file size, a file type, creation time, and a title may be displayed. When a search result is an address book card or contact information, a complete address book card or complete contact information may be displayed. When a search result is an SMS message or APP data, an application name, generation time, context content including the first key word, and the like may be displayed.

407. The first terminal sends the first search result to the second terminal.

Optionally, after the first terminal finds the first search result associated with the first key word (step 402), the first terminal may also send, in the multicast form, the first search result to another terminal in the device group, for example, the second terminal. Therefore, each terminal in the device group can obtain the first search result associated with the first key word in the first terminal. In this way, each terminal in the device group can obtain the search results of the first key word that are in all the terminals and that are shown in FIG. 5, and the user can view the search results of the first key word on any terminal in the device group.

408. The first terminal obtains an operation instruction that is triggered by the user for target content in the second search result.

Figure 6:
FIG. 6 is a schematic diagram 3 of an application scenario of a search method according to an embodiment of the present invention.

For example, as shown in FIG. 6, after the first terminal presents the user with all the search results, namely, the first search result and the second search result, the user triggers an operation instruction for target content in the second search result. For example, in FIG. 6, the user taps the found audio file (namely, the target content) in the second search result to trigger a music play instruction.

In this case, the first terminal may execute the operation instruction (as described in the following steps 409a and 410a), or the second terminal may execute the operation instruction (as described in the following step 409b).

409a. The first terminal synchronizes the target content from the second terminal to the first terminal.

410a. Execute the operation instruction on the first terminal.

Figure 7:
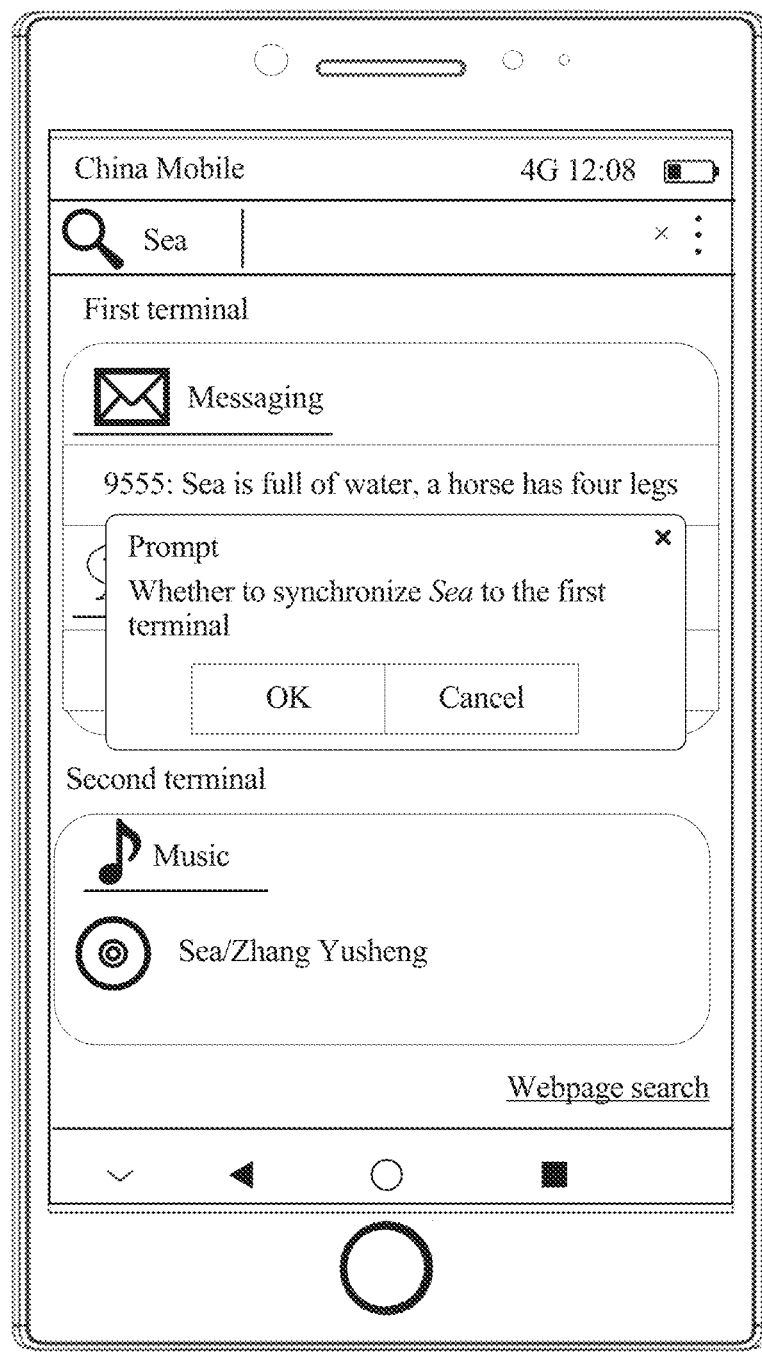
FIG. 7 is a schematic diagram 4 of an application scenario of a search method according to an embodiment of the present invention.

In step 409*a*, because the target content in the second search result is stored in the second terminal, as shown in FIG. 7, the first terminal may prompt, by using a display interface, the user to determine whether to synchronize the target content to the first terminal; and after the user determines to synchronize the target content to the first terminal, the first terminal may obtain the target content from the second terminal, for example, an audio file of Sea shown in FIG. 7.

In this way, in step 410*a*, because the target content has been synchronized to the first terminal, the audio file named Sea can be directly played on the first terminal, in other words, the operation instruction can be executed on the first terminal.

409*b*. The first terminal prompts the user to execute the operation instruction on the second terminal.

In step 409*b*, when the user triggers the operation instruction for the target content in the second search result, the first terminal may further determine, based on a current running status of the first terminal and/or a specification of the target content, whether the first terminal is currently capable of executing the operation instruction. If the first terminal is currently incapable of executing the operation instruction, the first terminal may prompt the user to execute the operation instruction on the second terminal to which the target content belongs.

For example, the target content is a picture in an Exif (Exchangeable Image File) format, but the first terminal does not support viewing of a picture of this type. In this case, the first terminal may prompt the user to execute, on the second terminal to Which the target content belongs, an operation instruction for opening the picture in the Exif format.

Figure 8:
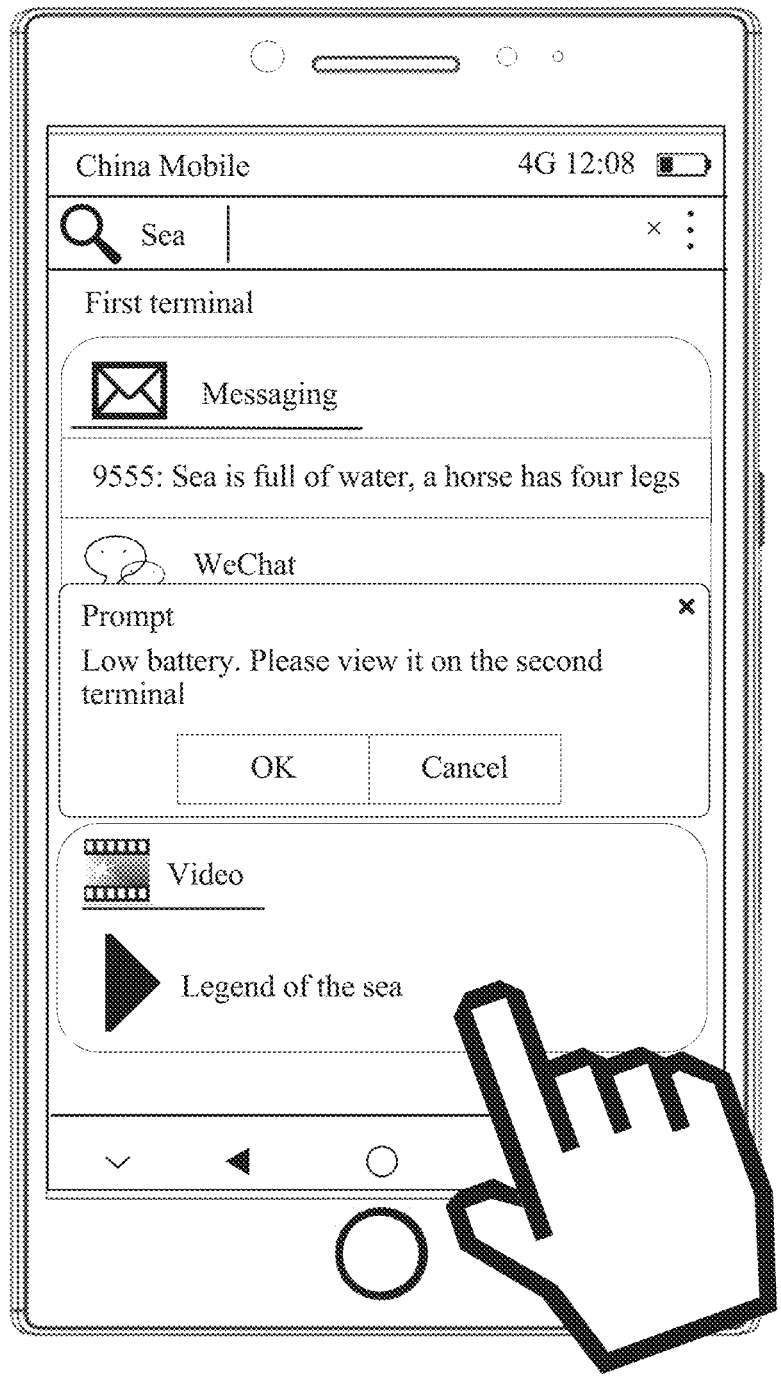
FIG. 8 is a schematic diagram 5 of an application scenario of a search method according to an embodiment of the present invention.

For another example, as shown in FIG. 8, the target content is a movie named Legend of the Sea, and a size of the movie is about 2G. In this case, if the first terminal is currently in low battery, or current transmission bandwidth between the first terminal and the second terminal is less than a threshold, the first terminal may be incapable of synchronizing the movie or normally playing the movie. Therefore, the first terminal may prompt the user to execute, on the second terminal to Which the target content belongs, an operation instruction for playing the movie.

For another example, the target content is a high-definition picture in a mobile phone, and the first terminal is a smartwatch. A screen of the smartwatch is relatively small, which is not conducive to presenting the high-definition picture. Therefore, the smartwatch (the first terminal) may prompt the user to execute, on the mobile phone (the second terminal) to which the target content belongs, an operation instruction for opening the high-definition picture.

Figure 9:
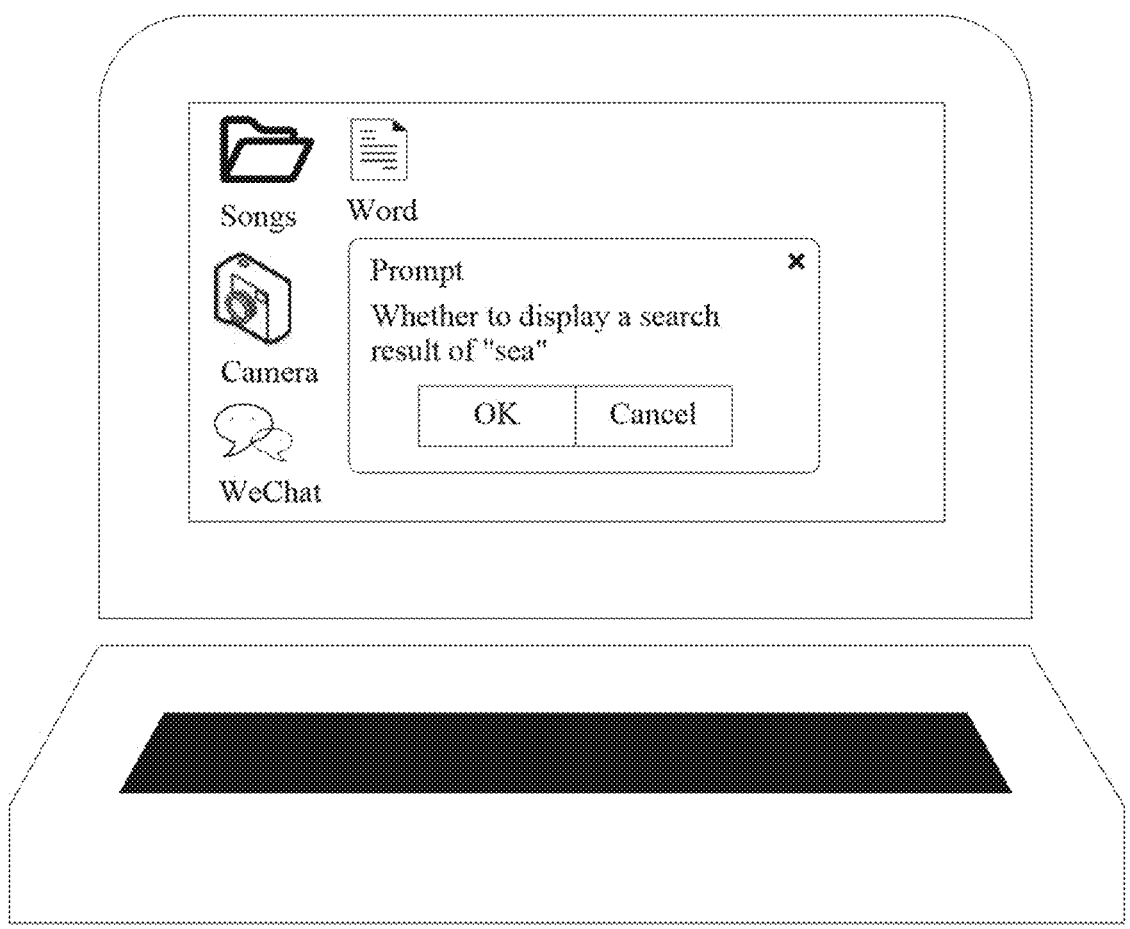
FIG. 9 is a schematic diagram 6 of an application scenario of a search method according to an embodiment of the present invention.
Figure 10:
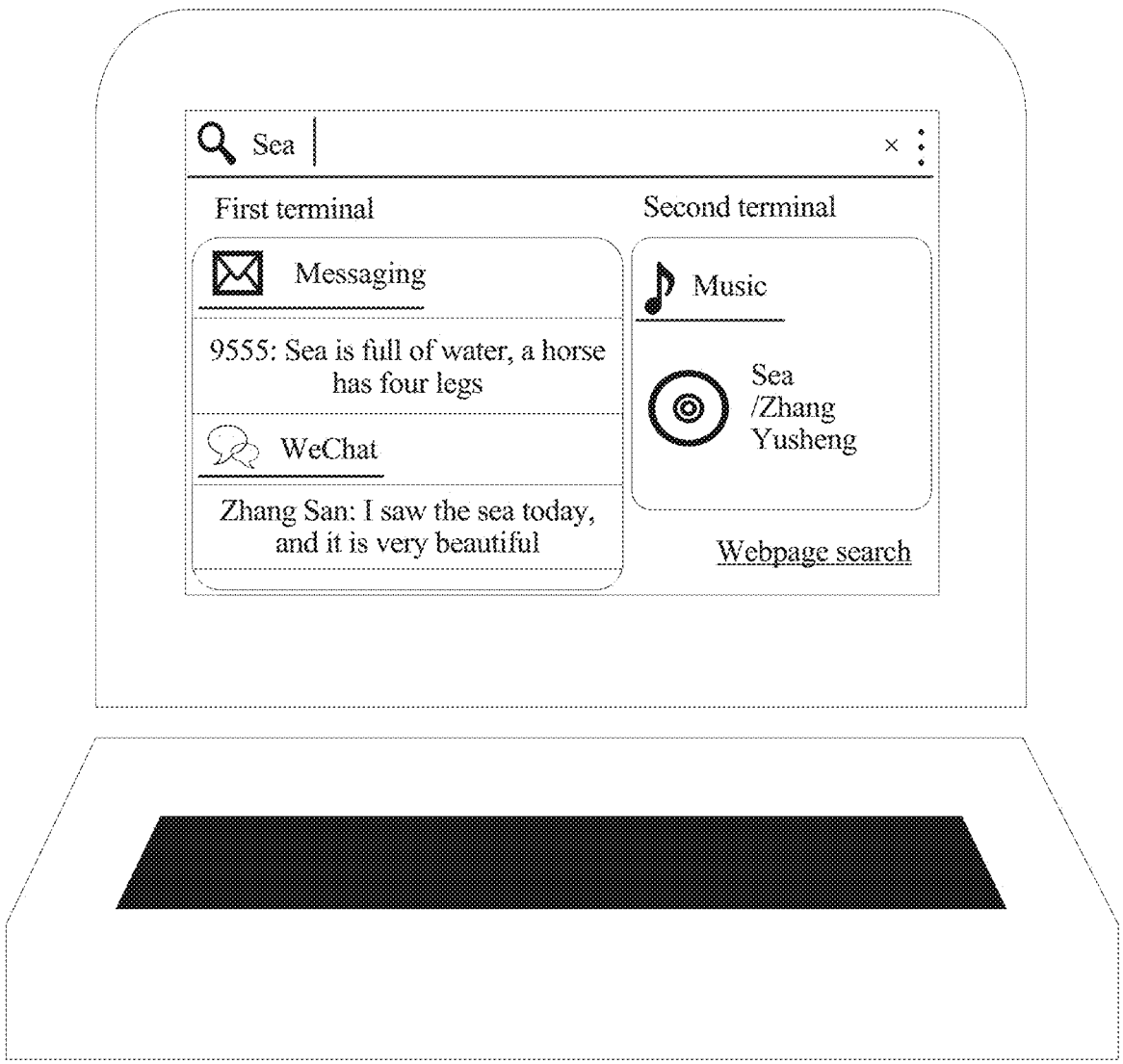
FIG. 10 is a schematic diagram 7 of an application scenario of a search method according to an embodiment of the present invention.

Further, when the user triggers a search function of the second terminal or starts the second terminal, as shown in FIG. 9, the second terminal is a notebook computer, and the notebook computer may prompt the user to determine whether to display all the search results of the first key word on the second terminal. In this case, if the user determines to display all the search results of the first key word, because the first terminal has sent the first search result of the first terminal to the second terminal, in other words, the second terminal has obtained the first search result and the second search result at the moment, as shown in FIG. 10, the second terminal may display the first search result and the second search result on a display screen of the second terminal. In this way, the user may directly trigger a corresponding operation instruction for the target content in the second search result. In this implementation, before the user views all the search results on the second terminal, the second terminal does not directly display the first search result and the second search result, so that an application that is currently running on the second terminal is not interrupted.

Certainly, after prompting the user to execute the operation instruction on the second terminal, the first terminal may also send an instruction message to the second terminal, to trigger the second terminal to directly execute the operation instruction. This is not limited in this embodiment of the present invention.

Figure 11:
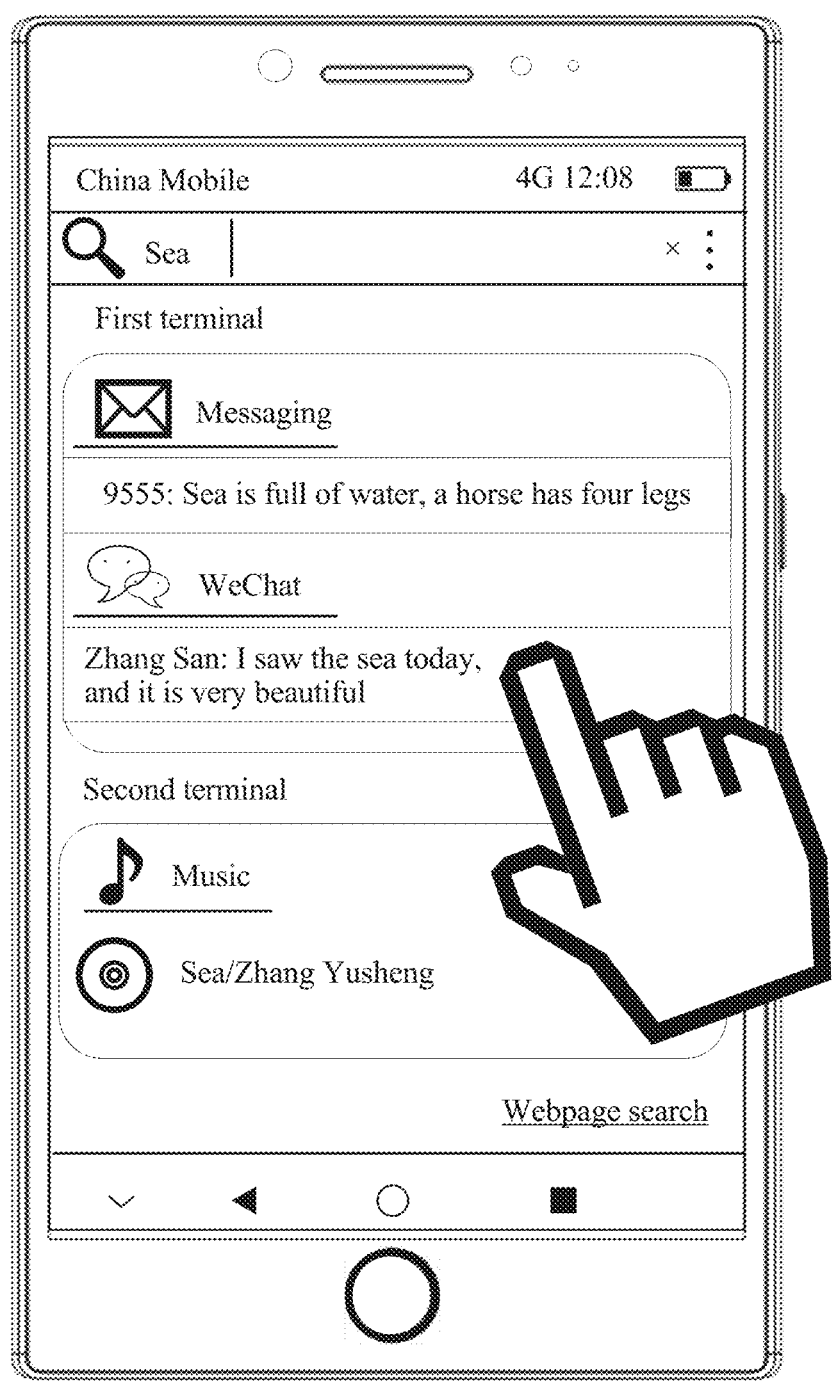
FIG. 11 is a schematic diagram 8 of an application scenario of a search method according to an embodiment of the present invention.

In addition, if the user triggers an operation instruction for target content in the first search result, for example, if the user triggers, when tapping a search result in a WeChat application in the first terminal in FIG. 11, an operation instruction for instructing the first terminal to enable the WeChat application, the first terminal may also determine, based on a current running status of the first terminal and/or a specification of the target content, whether the first terminal is currently capable of executing the operation instruction.

If it is determined that the first terminal is currently incapable of executing the operation instruction, for example, current CPU usage of the first terminal is higher than 90%, running of the first terminal may be frozen when the operation instruction is further executed on the first terminal. Therefore, it may be determined that the first terminal is currently incapable of executing the operation instruction. In this case, the first terminal may determine, based on parameters such as a running status of each device in the device group, a device specification, and a network performance indicator of a local area network formed by the device group, at least one terminal that can execute the operation instruction, and prompt the user to execute the operation instruction on the terminal.

Figure 12:
FIG. 12 is a schematic diagram 9 of an application scenario of a search method according to an embodiment of the present invention.

As shown in FIG. 12, if a WeChat application is installed only on a tablet computer in the device group in addition to the first terminal, the first terminal may prompt the user to execute, on the tablet computer, an operation instruction for enabling the WeChat application.

In this way, when the user needs to open a search result, a terminal in the device group may flexibly recommend, based on an actual capability of the terminal, that the user executes an operation instruction corresponding to the search result on a terminal with better experience, to meet a search requirement of the user to a maximum extent, and improve intelligence of human computer interaction.

Certainly, in a possible design method, when the user triggers an operation instruction for the target content in the second search result in the first terminal, the first terminal may prompt, by using a prompt box, the user to choose to execute the operation instruction on the first terminal or execute the operation instruction on the second terminal. In this case, if the user chooses to execute the operation instruction on the first terminal, the first terminal executes the foregoing steps 409*a* and 410*a*. If the user chooses to execute the operation instruction on the second terminal, the first terminal executes the foregoing step 409*b*. Details are not described in this embodiment of the present invention again.

Further, after the foregoing steps 401 to 406 are performed, the user may initiate a new search if the user is dissatisfied with a current search result, for example, when excessive search results are obtained.

Figure 13:
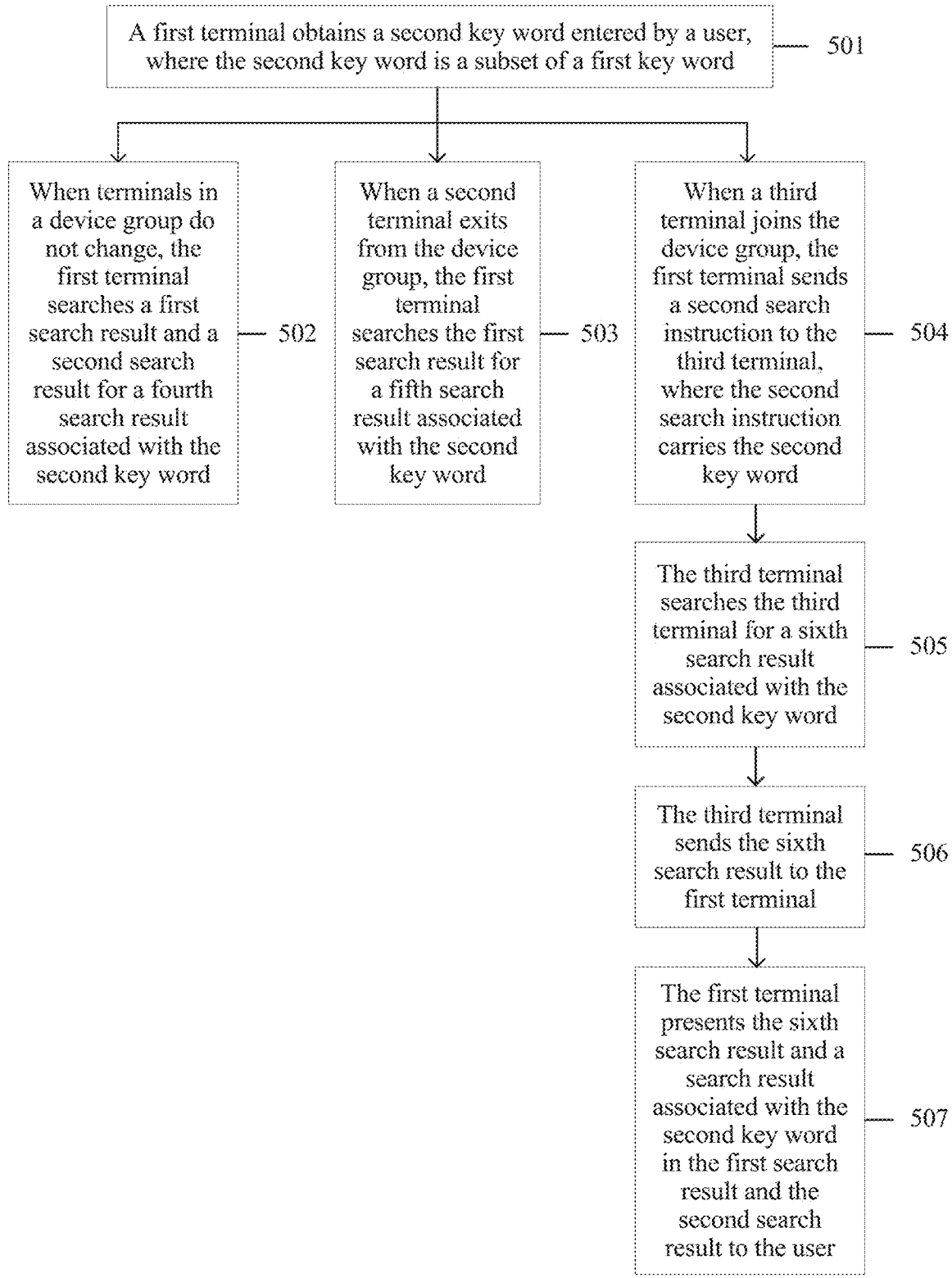
FIG. 13 is a schematic flowchart of a search method according to an embodiment of the present invention.

In this case, as shown in FIG. 13, the search method provided in this embodiment of the present invention further includes the following steps 501 to 507.

501. The first terminal obtains a second key word entered by the user, where the second key word is a subset of the first key word.

For example, the user searches the first terminal for the first key word "sea" last time, and obtains 80 search results (namely, the first search result and the second search result) after the foregoing steps 401 to 406 are performed. Faced with the relatively large quantity of search results, the user modifies the first key word "sea" to the second key word "sea MP3". In this case, the second key word "sea MP3" includes the first key word "sea". Therefore, the second key word may be used as a subset of the first key word.

Optionally, the first terminal may still use the search method in the foregoing steps 401 to 406, and use the second key word entered by the user as a new search request for searching. Alternatively, because the second key word is a subset of the first key word, a search result for the second key word is also associated with the search results of the first key word. Therefore, the first terminal may select, for the user based on a changing status of the terminals in the device group and based on the search results (namely, the first search result and the second search result) of the first key word, a search result associated with the second key word. Specifically, reference may be made to related descriptions of the following steps 502 to 507.

502. When terminals in the device group do not change, the first terminal searches the first search result and the second search result for a fourth search result associated with the second key word.

For example, when the first key word is searched for, the terminals in the device group include the first terminal and the second terminal. In this case, when the first terminal obtains the second key word entered by the user, if the terminals in the device group are still the first terminal and the second terminal, it indicates that the terminals in the device group do not change.

In this case, because the second key word entered by the user is a subset of the first key word, the search result of the second key word should also be a subset of the search results of the first key word. Therefore, the first terminal may directly search the search results (namely, the first search result and the second search result) of the first key word for the fourth search result associated with the second key word.

For example, the first terminal may directly search all the search results of the first key word "sea" for a search result, namely, the fourth search result, associated with the second key word "sea MP3".

503. When the second terminal exits from the device group, the first terminal searches the first search result for a fifth search result associated with the second key word.

For example, when the first key word is searched for, the terminals in the device group include the first terminal and the second terminal. In this case, when the first terminal obtains the second key word entered by the user, if there is only the first terminal in the device group, it indicates that the second terminal has exited from the device group at the moment.

Therefore, the first terminal may delete the second search result of the exited second terminal from the first search result and the second search result, and reserve the first search result of the first terminal that is still in the device group, and then search the first search result for the fifth search result associated with the second key word "sea MP3".

Similarly, when the first terminal exits from the device group, the first terminal may delete the first search result of the exited first terminal, and then search the reserved second search result for a search result associated with the second key word "sea MP3".

504. When a third terminal joins the device group, the first terminal sends a second search instruction to the third terminal, where the second search instruction carries the second key word.

505. In response to the second search instruction, the third terminal searches the third terminal for a sixth search result associated with the second key word.

506. The third terminal sends the sixth search result to the first terminal.

507. The first terminal presents the sixth search result and a search result associated with the second key word in the first search result and the second search result to the user.

For example, when the first key word is searched for, the terminals in the device group include the first terminal and the second terminal. In this case, when the first terminal obtains the second key word entered by the user, if the new third terminal further joins the device group in addition to the first terminal and the second terminal, it indicates that the third terminal joins the device group at the moment.

In this case, because the third terminal does not participate in the previous search process for the first key word, in step 504, the first terminal may send the second search instruction to the third terminal. The second search instruction carries the second key word "sea MP3".

Then, in steps 505 and 506, the third terminal locally searches, based on the second key word carried in the second search instruction, the third terminal for the sixth search result associated with the second key word. Subsequently, the third terminal may also send, in a multicast from, the sixth search result to the first terminal and all the terminals in the device group except the third terminal.

In this way, in step 507, the first terminal may still search the first search result and the second search result for a search result associated with the second key word "sea MP3", combine the search result with the sixth search result, and present combined search results to the user.

Certainly, in addition to sending the second search instruction to the third terminal, the first terminal may further send the search result associated with the second key word in the first search result and the second search result to the third terminal, so that the third terminal can also obtain complete search results associated with the second key word in the entire device group, and the user can view the search results of the second key word on any terminal in the device group.

It can be learned from steps 501 to 507 that, for continuous search behavior of the user, when the second key word that is later searched for is a subset of the first key word that is earlier searched for, the user does not need to initiate a new search process on each terminal in the device group, but determines a search result of the second key word based on a changing status of the terminals in the device group and based on the search results of the first key word, thereby improving continuous search efficiency.

Figure 14:
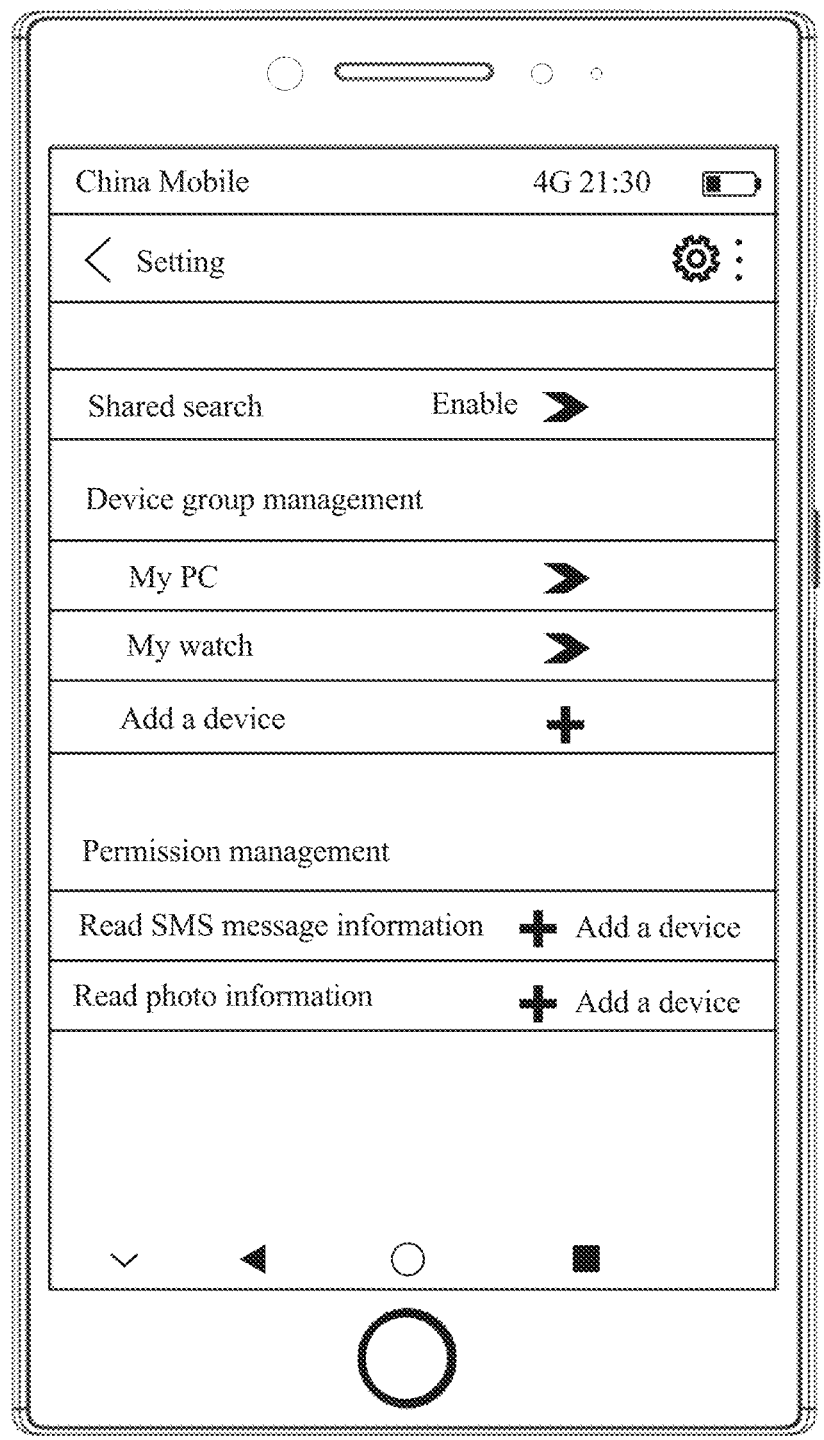
FIG. 14 is a schematic diagram 10 of an application scenario of a search method according to an embodiment of the present invention.

In addition, as shown in FIG. 14, the user may further manage the foregoing shared search function by using a setting interface. For example, the user manually set whether to enable the shared search function. For another example, the user manually adds a terminal to the device group or deletes a terminal from the device group.

For another example, the user may further open different permission for each terminal in the device group, such as permission to allow only a mobile phone in the device group to read SMS message information, and permission to allow only a watch in the device group to read photo information. In this way, when searching for a search result associated with a key word, different terminals in the device group may search, based on permission opened for the terminals, content corresponding to the opened permission, to reduce a risk that user privacy is disclosed during interworking between the terminals in the device group.

Figure 15:
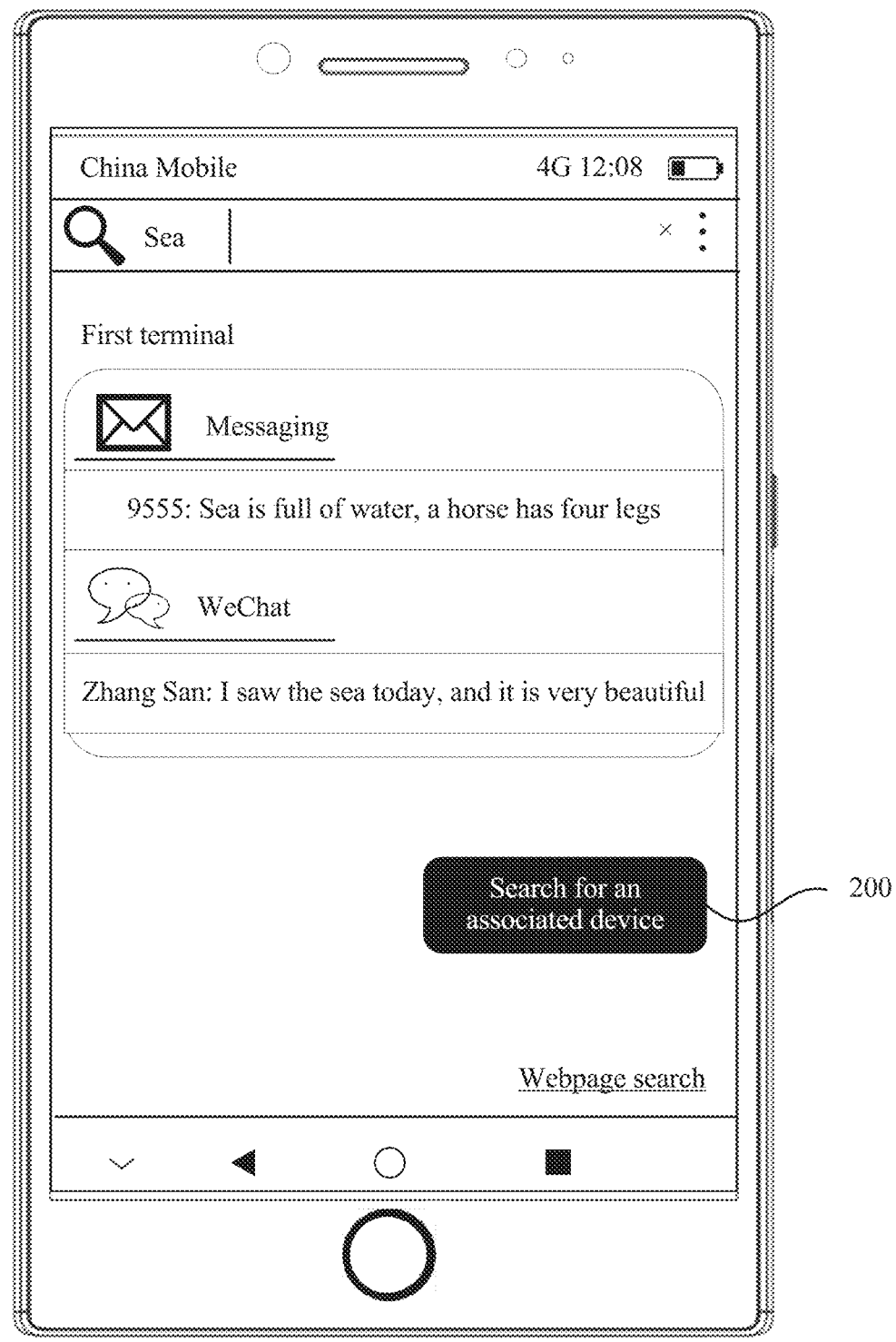
FIG. 15 is a schematic diagram 11 of an application scenario of a search method according to an embodiment of the present invention.

Further, if the user does not enable the shared search function, when the user uses the first terminal to search for the first key word "sea", as shown in FIG. 15, a search result displayed by the first terminal includes only the first search result associated with the first key word in the first terminal. In this case, as shown in FIG. 15, a key 200 for triggering a shared search may be set on a current display interface. Then, when tapping the "Search for an associated device" key in FIG. 15, the user triggers the first terminal to enable the shared search function.

In this case, if the first terminal has established connections to one or more terminals, for example, the first terminal has established a Bluetooth connection to the second terminal, or the user logs in to the first terminal and the second terminal by using a same account, the first terminal may use these connected terminals as a device group by default, and steps 401 to 410*a* (or 409*b*) and steps 501 to 507 in the foregoing embodiment are performed.

Alternatively, the first terminal may jump to the setting interface shown in FIG. 14, so that the user may manually set a terminal in the device group or add a terminal to the device group, and establish a communication connection between the terminals in the device group.

Figure 16:
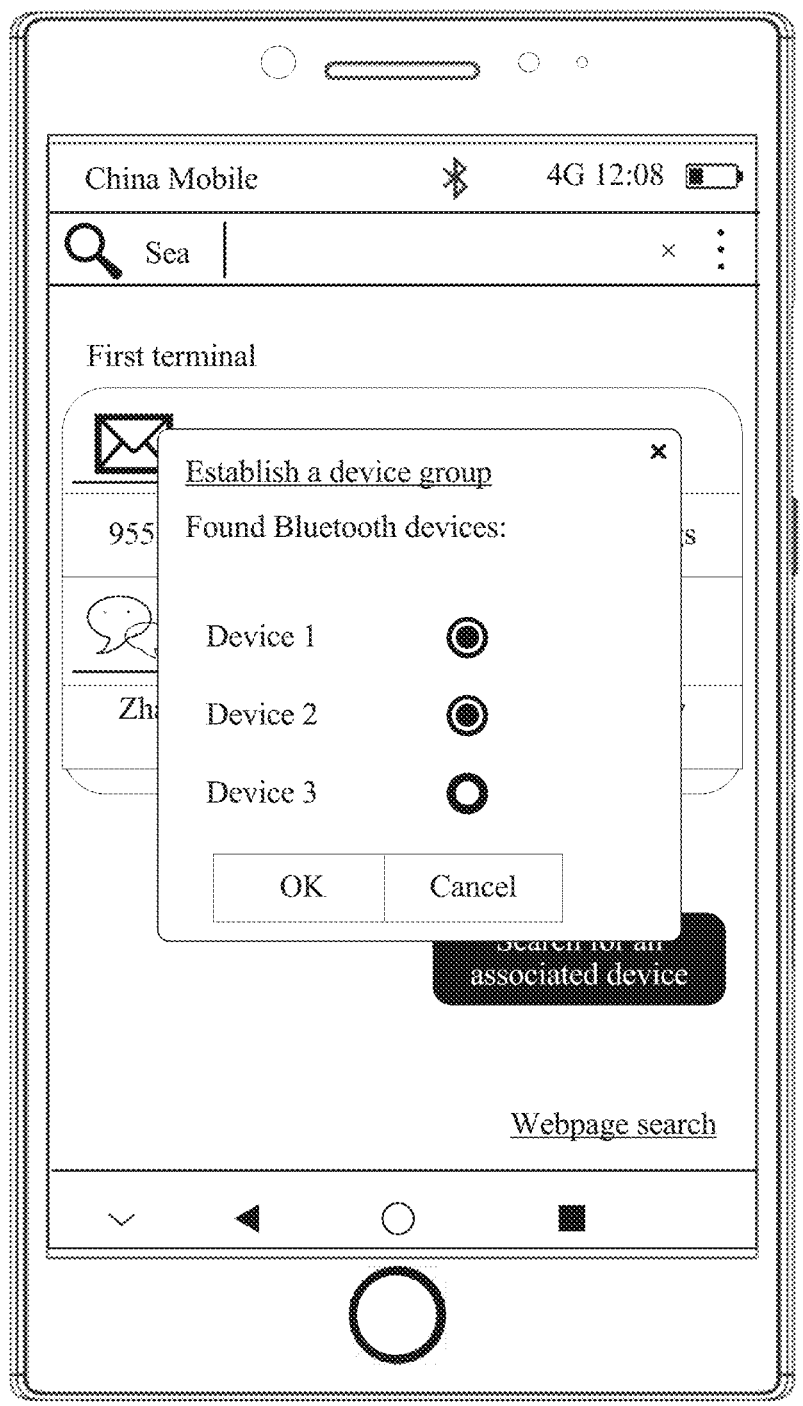
FIG. 16 is a schematic diagram 12 of an application scenario of a search method according to an embodiment of the present invention.

Alternatively, the first terminal may recommend one or more devices currently found by using Bluetooth and/or Wi-Fi to the user as candidate terminals. In this case, as shown in FIG. 16, the user may select one or more terminals from the candidate terminals to form a device group, and then establish a communication connection between the terminals in the device group. This is not limited in this embodiment of the present invention.

Figure 17:
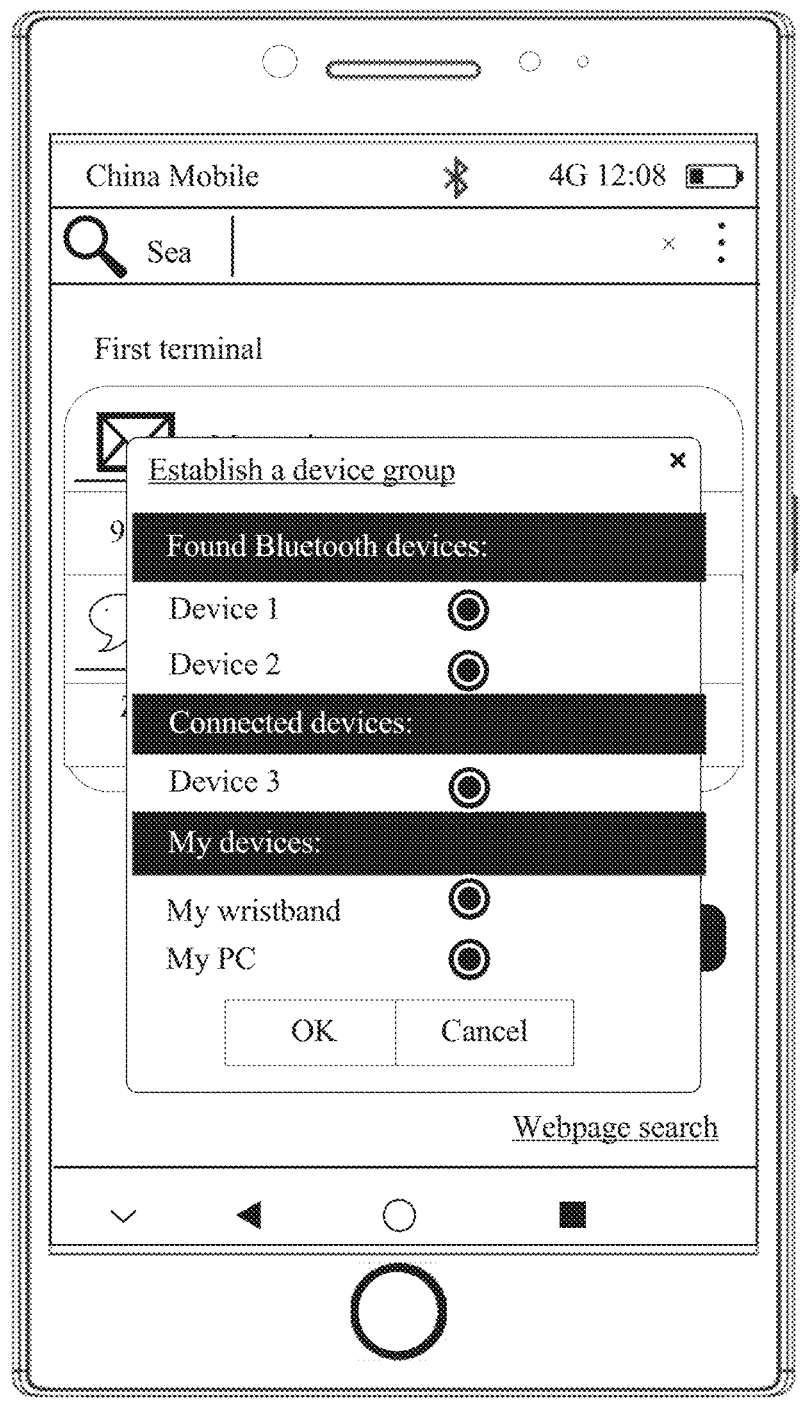
FIG. 17 is a schematic diagram 13 of an application scenario of a search method according to an embodiment of the present invention.

For example, after the user triggers the key 200 for a shared search in FIG. 15, as shown in FIG. 17, a first terminal 100 may recommend currently-found Bluetooth devices (for example, a device 1 and a device 2 in FIG. 17), a device that has established a connection to the first terminal 100 (for example, a device 3 in FIG. 17), and a device logged in to by using a same account as that of the first terminal 100 (for example, my wristband and my PC in FIG. 17) to the user as candidate terminals. In this way, the user may select one or more terminals from the candidate terminals to form a device group. For example, the user taps an "OK" key after selecting the device 1, the device 3, and my PC. In other words, in this case, members in the device group include a total of four terminals: the first terminal 100, the device 1, the device 3, and my PC. Because a connection has been established between the first terminal 100 and the device 3, a connection relationship between other terminals in the device group may be further established, so that interworking can be implemented between any two terminals in the device group. Optionally, in a specific implementation, if the user selects the device 1 to establish a device group, the search operation may also trigger establishment of a communication connection to the device 1, without a separate connection establishment operation.

Subsequently, the first terminal 100 may implement a shared data search among a plurality of terminals according to the search method provided in steps 401 to 410*a* (or 409*b*) and steps 501 to 507 in the foregoing embodiment, to improve search efficiency.

In an optional implementation, different devices may differ in search permission. For example, for my devices, for example, a device logged in to by using a same account as that of the foregoing first terminal, or another device that has established a trust relationship with the foregoing first terminal, information with a relatively high privacy level such as an e-mail, an SMS message, or a bill may be found when a search is triggered. However, for a general device that has established a connection to the foregoing first terminal, only general information, for example, information with a relatively low privacy level such as a picture and music, may be found when a search is triggered. In this way, security can be further improved by setting permission.

It may be understood that, to implement the foregoing functions, the foregoing terminal or the like includes corresponding hardware structures and/or software modules for implementing the functions. A person skilled in the art should be easily aware that, the units and algorithm steps in the examples described with reference to the embodiments disclosed in this specification can be implemented in the embodiments of the present invention by hardware or a combination of hardware and computer software. Whether the functions are performed by hardware or by computer software by driving hardware depends on particular applications and design constraint conditions of the technical solutions. A person skilled in the art may use different methods to implement the described functions for each particular application, but it should not be considered that the implementation goes beyond the scope of the embodiments of the present invention.

In the embodiments of the present invention, the foregoing terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in actual implementation.

Figure 18:
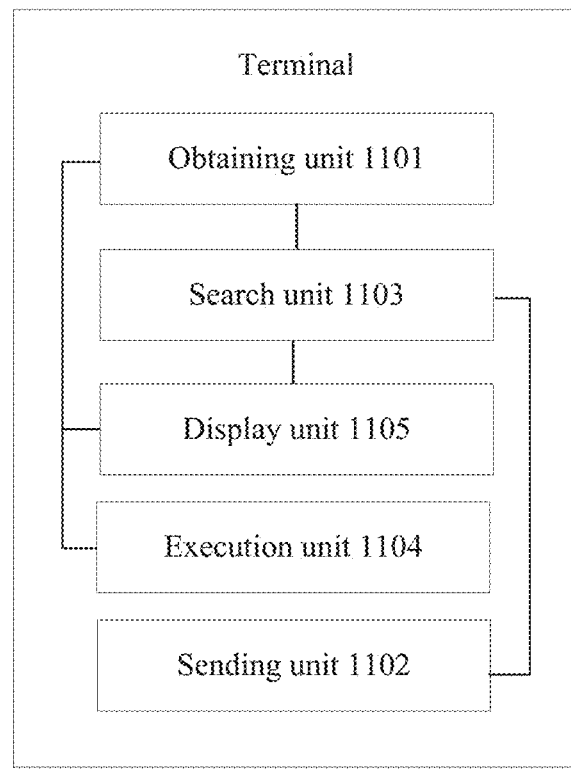
FIG. 18 is a schematic structural diagram 2 of a terminal according to an embodiment of the present invention.

When each function module is obtained through division based on each corresponding function, FIG. 18 is a possible schematic structural diagram of the terminal (for example, the foregoing first terminal or second terminal) in the foregoing embodiments. The terminal includes an obtaining unit 1101, a sending unit 1102, a search unit 1103, an execution unit 1104, and a display unit 1105.

The obtaining unit 1101 is configured to support the terminal in performing the processes 401 and 408 in FIG. 4 and the process 501 in FIG. 13. The sending unit 1102 is configured to support the terminal in performing the processes 403, 405, 407, and 409*a* in FIG. 4 and the processes 504 and 506 in FIG. 13. The search unit 1103 is configured to support the terminal in performing the processes 402 and 404 in FIG. 4 and the processes 502, 503, and 505 in FIG. 13. The execution unit 1104 is configured to support the terminal in performing the process 410*a* in FIG. 4. The display unit 1105 is configured to support the terminal in performing the processes 406 and 409*b* in FIG. 4 and the process 507 in FIG. 13. For function descriptions of the corresponding function modules, refer to any content related to the steps in the foregoing method embodiments. Details are not described herein again.

Figure 19:
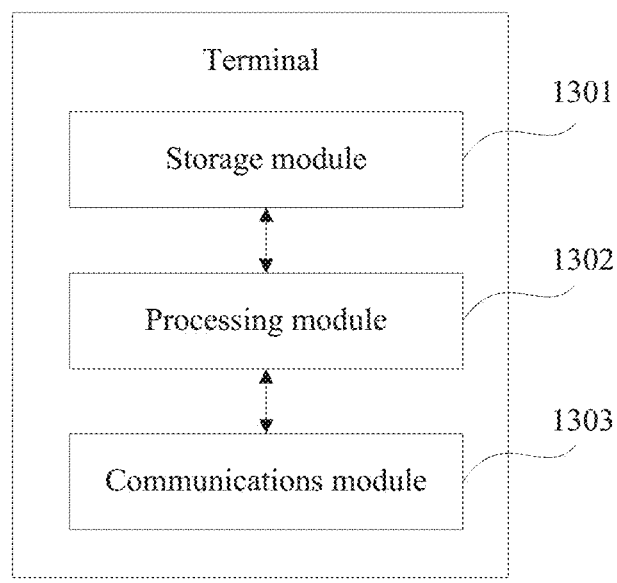
FIG. 19 is a schematic structural diagram 3 of a terminal according to an embodiment of the present invention.

When an integrated unit is used, FIG. 19 is a possible schematic structural diagram of the terminal (for example, the foregoing first terminal or second terminal) in the foregoing embodiments. The terminal includes a processing module 1302 and a communications module 1303. The processing module 1302 is configured to control and manage an action of the terminal. The communications module 1303 is configured to support communication between UE and another network entity. The terminal may further include a storage module 1301, configured to store program code and data of the terminal.

The processing module 1302 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field. Programmable Gate Array, FPGA) or another programmable logic device, a transistor logic device, a hardware component, or any combination thereof. The processing module 1302 may implement or execute various example logical blocks, modules, and circuits that are described with reference to the content disclosed in the present invention. The processor may also be a combination implementing a computing function, for example, a combination including one or more microprocessors, or a combination of a DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and the storage module 1301 is a memory, the terminal provided in this embodiment of the present invention may be the mobile phone 100 shown in FIG. 2.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded onto and executed on the computer, all or some of the procedures or functions according to the embodiments of the present invention are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a MID), a semiconductor medium (for example, a solid state disk (SSD)), or the like.

The foregoing descriptions are merely specific implementations of this application, but are not intended to limit the protection scope of this application. Any variation or replacement in the technical scope disclosed in this application shall fall within the protection scope of this application. Therefore, the protection scope of this application shall be subject to the protection scope of the claims.

What is claimed is:

1. A search method implemented by a first terminal, the search method comprising:
    obtaining a first key word from a user;
    searching, based on the first key word, for a first search result associated with the first key word in the first terminal;
    sending a first search instruction to a second terminal, wherein the first search instruction comprises the first key word, and wherein the first terminal and the second terminal are members of a device group;
    obtaining a second search result from the second terminal, wherein the second search result is associated with the first key word in the second terminal;
    displaying the first search result and the second search result;
    obtaining an operation instruction from the user for target content in the second search result;
    synchronizing the target content from the second terminal to the first terminal;
    executing the operation instruction;
    obtaining a second key word from the user; and
    searching the first search result for a new search result associated with the second key word when the second terminal exits from the device group.

2. The search method of claim 1, wherein after displaying the first search result and the second search result, the search method further comprises:
    obtaining an operation instruction from the user for target content in the second search result; and
    prompting the user to execute the operation instruction on the second terminal.

3. The search method of claim 1, wherein after obtaining the second search result, the search method further comprises obtaining a third search result from the second terminal, wherein the third search result is associated with the first key word in the second terminal, and wherein there is no intersection set between the third search result and the second search result.

4. The search method of claim 1, wherein the second key word is a subset of the first key word, the method further comprising searching, when terminal composition of the device group does not change, the first search result and the second search result for a fourth search result associated with the second key word.

5. The search method of claim 4, wherein after obtaining the second key word, the search method further comprises:
    sending, when detecting that a third terminal has joined the device group, a second search instruction to the third terminal, wherein the second search instruction comprises the second key word; and
    obtaining a sixth search result from the third terminal, wherein the sixth search result is associated with the second key word in the third terminal.

6. The search method of claim 1, wherein after searching the first terminal for the first search result associated with the first key word, the search method further comprises sending the first search result to the second terminal.

7. The search method of claim 1, wherein displaying the first search result and the second search result comprises:
    displaying the first search result and an identifier of the first terminal in a first display area; and
    displaying the second search result and an identifier of the second terminal in a second display area, wherein the first display area and the second display area do not overlap within a display interface.

8. The search method of claim 1, wherein the device group comprises at least one of N terminals logged in to a same account or N terminals that have established connections to the first terminal, and wherein N is an integer greater than 1.

9. A search method implemented by a second terminal, the search method comprising:
obtaining a first search instruction from a first terminal, wherein the first search instruction comprises a first key word from a user into the first terminal, and wherein the first terminal and the second terminal are members of a device group;
searching for a second search result associated with the first key word in the second terminal;
sending the second search result to the first terminal;
obtaining an operation instruction from the user for target content in the second search result;
synchronizing the target content from the second terminal to the first terminal;
executing the operation instruction;
obtaining a second key word from the user; and
searching the first search result for a new search result associated with the second key word when the first terminal exits from the device group.

10. The search method of claim 9, wherein after obtaining the first search instruction, the search method further comprises receiving a first search result from the first terminal, and wherein the first search result is associated with the first key word in the first terminal.

11. The search method of claim 10, wherein after receiving the first search result, the search method further comprises displaying the first search result and the second search result.

12. The search method of claim 9, wherein after searching for the second search result, the search method further comprises:
searching the second terminal for a third search result associated with the first key word, wherein there is no intersection set between the third search result and the second search result; and
sending the third search result to the first terminal.

13. The search method of claim 9, wherein the second key word is a subset of the first key word, the method further comprising searching, when terminal composition of the device group does not change, the first search result and the second search result for a fourth search result associated with the second key word.

14. The search method of claim 9, wherein after obtaining the second key word, the search method further comprises:
sending, when detecting that a third terminal has joined the device group, a second search instruction to the third terminal, wherein the second search instruction comprises the second key word; and
obtaining a sixth search result from the third terminal, wherein the sixth search result is associated with the second key word in the third terminal.

15. The search method of claim 9, wherein displaying the first search result and the second search result comprises:
displaying the first search result and an identifier of the first terminal in a first display area; and
displaying the second search result and an identifier of the second terminal in a second display area, wherein the first display area and the second display area do not overlap within a display interface.

16. The search method of claim 9, wherein the device group comprises at least one of N terminals logged in to a same account or N terminals that have established connections to the first terminal, and wherein N is an integer greater than 1.

17. A first terminal comprising:
a memory comprising instructions; and
a processor coupled to the memory and configured to execute the instructions to:
obtain a first key word from a user;
search, based on the first key word, for a first search result associated with the first key word in the first terminal;
send a first search instruction to a second terminal, wherein the first search instruction comprises the first key word, and wherein the first terminal and the second terminal are part of a device group;
obtain a second search result from the second terminal, wherein the second search result is associated with the first key word in the second terminal;
display the first search result and the second search result;
obtain an operation instruction from the user for target content in the second search result;
synchronize the target content from the second terminal to the first terminal;
execute the operation instruction;
obtain a second key word from the user; and
search the first search result for a new search result associated with the second key word when the second terminal exits from the device group.

18. The first terminal of claim 17, wherein after displaying the first search result and the second search result, the processor is further configured to:
obtain an operation instruction from the user for target content in the second search result; and
prompt the user to execute the operation instruction on the second terminal.

19. The first terminal of claim 17, wherein after obtaining the second search result, the processor is further configured to obtain a third search result from the second terminal, wherein the new search result is associated with the first key word in the second terminal, and wherein there is no intersection set between the third search result and the second search result.

20. The first terminal of claim 17, wherein after obtaining a second key word from the user and when a third terminal joins the device group, the processor is further configured to:
send a second search instruction to the third terminal, wherein the second search instruction comprises the second key word; and
obtain a fourth search result from the third terminal, wherein the fourth search result is a search result associated with the second key word in the third terminal.

* * * * *